United States Patent
Zhang et al.

(10) Patent No.: US 11,310,138 B2
(45) Date of Patent: Apr. 19, 2022

(54) METHOD AND APPARATUS FOR INDICATING FAULT IN FLEXIBLE ETHERNET

(71) Applicant: HUAWEI TECHNOLOGIES CO., LTD., Shenzhen (CN)

(72) Inventors: Xiaojun Zhang, Shenzhen (CN); Qichang Chen, Shenzhen (CN); Lehong Niu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/906,486

(22) Filed: Jun. 19, 2020

(65) Prior Publication Data
US 2020/0322241 A1    Oct. 8, 2020

Related U.S. Application Data

(63) Continuation of application No. PCT/CN2018/122933, filed on Dec. 22, 2018.

(30) Foreign Application Priority Data

Dec. 26, 2017  (CN) .......................... 201711437572.6

(51) Int. Cl.
*H04L 12/26* (2006.01)
*H04L 43/0823* (2022.01)
*H04L 69/323* (2022.01)

(52) U.S. Cl.
CPC ........ *H04L 43/0823* (2013.01); *H04L 69/323* (2013.01)

(58) Field of Classification Search
CPC ......... H04J 2203/006; H04J 2203/0085; H04J 3/14; H04J 3/1658; H04L 12/437; H04L 29/08; H04L 43/0823; H04L 69/323
(Continued)

(56) References Cited

U.S. PATENT DOCUMENTS

2014/0258795 A1 *  9/2014  Schnizler ............... H04L 1/244
                                                              714/705
2014/0344654 A1 * 11/2014  Lee ......................... G06F 11/10
                                                              714/807
(Continued)

FOREIGN PATENT DOCUMENTS

CN          106612220 A       5/2017
CN          106788855 A       5/2017
(Continued)

OTHER PUBLICATIONS

IEEE 802.3-2015_Section1-6,IEEE Standard for Ethernet,IEEE Std 802.3-2015(Revision of IEEE Std 802.3-2012), dated Sep. 3, 2015.
(Continued)

*Primary Examiner* — Robert J Lopata
(74) *Attorney, Agent, or Firm* — Stein IP, LLC

(57) ABSTRACT

The present subject matter relates to the field of communications technologies, and in particular, to a method and an apparatus for indicating a fault in flexible Ethernet. The method for indicating a fault includes: detecting whether a fault occurs in at least one physical layer entity included in a flexible Ethernet group; and when a fault occurs in the at least one physical layer entity, periodically sending a fault indication code block to a flexible Ethernet client corresponding to the at least one physical layer entity in which the fault occurs. Not all bandwidth of a downstream transmission path in the flexible Ethernet is occupied, and data transmission on a non-faulty channel in a same flexible Ethernet group is not affected, thereby reducing a quantity of affected flexible Ethernet clients.

16 Claims, 32 Drawing Sheets

(58) Field of Classification Search
USPC .......................................................... 370/242
See application file for complete search history.

(56) References Cited

U.S. PATENT DOCUMENTS

| | | | |
|---|---|---|---|
| 2017/0005901 A1 | 1/2017 | Gareau | |
| 2017/0118041 A1* | 4/2017 | Bhattacharya | H04L 41/5054 |
| 2017/0272308 A1* | 9/2017 | Stone | H04L 47/10 |
| 2018/0152367 A1* | 5/2018 | Gareau | H04L 43/0811 |
| 2019/0229846 A1* | 7/2019 | Liu | H04B 17/30 |
| 2020/0007256 A1* | 1/2020 | Liu | H04B 17/30 |
| 2020/0177442 A1* | 6/2020 | Zhang | H04L 41/0681 |
| 2020/0228458 A1* | 7/2020 | Huang | H04L 5/00 |
| 2020/0259580 A1* | 8/2020 | Zhong | H04J 3/24 |

FOREIGN PATENT DOCUMENTS

| | | |
|---|---|---|
| CN | 107453905 A | 12/2017 |
| JP | 2001308753 A | 11/2001 |

OTHER PUBLICATIONS

Flex Ethernet, Implementation Agreement, IA#OIF-FLEXE-01.0, Mar. 2016. 31 pages.

\* cited by examiner

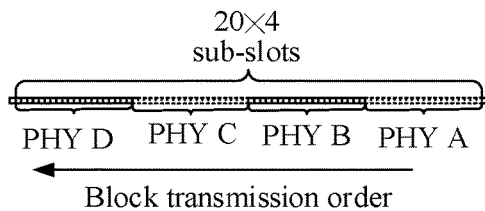
FIG. 10
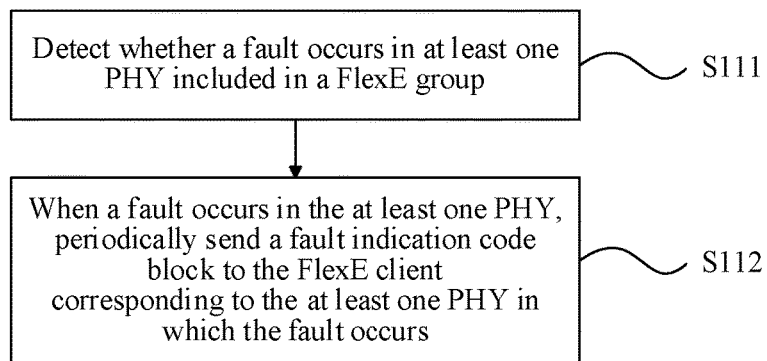
FIG. 11
| 1 | 0 | 0x1E | /I/ (0x00) | /I/ (0x00) | /I/ (0x00) | /I/ (0x00) | /I/ (0x00) | /I/ (0x00) | /I/ (0x00) | /I/ (0x00) |
FIG. 12
| 1 | 0 | 0x4B | 0x00 | 0x00 | 0x00 / 0x03~0xff | 0x0 | 0x0 | 0x00 | 0x00 | 0x00 |
FIG. 13

| 1 | 0 | 0x4B | 0x00 | 0x00 | 0x00 | 0xA | 0x0 | 0x00 | 0x00 | 0x00 |

| 1 | 0 | 0x00 | D1 | D2 | D3 | D4 | D5 | D6 | D7 |

| 1 | 0 | 0x4B | 0x00 | 0x00 | 0x01 | 0x0 | 0x000_0000 |

METHOD AND APPARATUS FOR INDICATING FAULT IN FLEXIBLE ETHERNET

CROSS-REFERENCE TO RELATED APPLICATIONS

This application is a continuation of International Application No. PCT/CN2018/122933, filed on Dec. 22, 2018, which claims priority to Chinese Patent Application No. 201711437572.6, filed on Dec. 26, 2017, The disclosures of the aforementioned applications are hereby incorporated by reference in their entireties.

TECHNICAL FIELD

The present subject matter relates to the communications field, and in particular, to a method and an apparatus for indicating a fault in flexible Ethernet.

BACKGROUND

The standards organization optical internetworking forum (optical internet forum, OIF) publishes a flexible Ethernet (FlexE for short) 1.0 implementation protocol based on a 100 G Ethernet standard, and provides functions such as rate aggregation, sub-rating, and channelization based on time-division multiplexing (TDM) of Ethernet service.

The rate aggregation of the FlexE supports a plurality of low-rate physical interfaces in jointly carrying a high-speed Ethernet service data flow, and the sub-rating and the channelization allow that one Ethernet physical interface concurrently carries a plurality of low-rate data flows. A large number of network devices supporting an Ethernet physical interface are deployed on an access network and a metropolitan area network of a live network, a FlexE interface is compatible with a standard Ethernet and extends functions and flexibility of the Ethernet, thereby having a great market application prospect and development space in a deterministic low-latency, high-bandwidth scenarios, such as fifth-generation mobile communications (5G) front haul and backhaul networks and data center interconnection.

In the FlexE, slots are divided through TDM, to implement hard isolation of bandwidth of a transmission channel. One service data flow may be allocated to one or more slots, to match services at various rates. A flexible Ethernet group (FlexE Group) may include one or more physical link interfaces, and a slot allocation table corresponding to the FlexE group is referred to as a FlexE calendar. A slot mapping table corresponding to a single physical link is referred to as a FlexE sub-calendar (sub-calendar).

The FlexE calendar includes one or more sub-calendars. Each sub-calendar indicates how 20 slots are allocated to a corresponding flexible Ethernet client (FlexE Client). The FlexE client represents a client data flow that is transmitted in a specified slot (one or more slots) on the FlexE group, and one FlexE group may carry a plurality of FlexE clients.

When a link in a FlexE group and carrying data of a FlexE client is faulty, an Ethernet local fault (LF) signal needs to be sent in a downstream direction of each FlexE client that is carried on the FlexE group. After a fault occurs in a FlexE group, an LF signal is continuously sent to each FlexE client carried on the faulty FlexE group, and the continuously transmitted LF signal occupies all bandwidth of downstream transmission paths of these FlexE clients.

SUMMARY

Embodiments of the present subject matter provide a method and an apparatus for indicating a fault in flexible Ethernet, a network device, and a storage medium.

According to a first aspect, an embodiment of the present subject matter provides a method for indicating a fault. The method includes: detecting whether a fault occurs in at least one physical layer entity included in a flexible Ethernet group; and when a fault occurs in the at least one physical layer entity, periodically sending a fault indication code block to a flexible Ethernet client corresponding to the at least one physical layer entity in which the fault occurs.

In the foregoing technical solution, when a fault occurs in a physical layer entity, a fault indication code block is sent to the flexible Ethernet client corresponding to the at least one physical layer entity in which the fault occurs. Compared to a technical solution in the prior art in which a local fault signal is continuously sent to each flexible Ethernet client carried on a flexible Ethernet group immediately after a fault occurs in a physical layer entity, in the technical solution provided in this embodiment of the present subject matter, the fault indication code block is sent to the flexible Ethernet client corresponding to the at least one physical layer entity in which the fault occurs. Therefore, not all bandwidth of a downstream transmission path in the flexible Ethernet is occupied, and data transmission on a non-faulty channel in the same flexible Ethernet group is not affected, thereby reducing a quantity of affected flexible Ethernet clients.

With reference to the first aspect, in a first possible implementation, the periodically sending a fault indication code block to a flexible Ethernet client corresponding to the at least one physical layer entity in which the fault occurs includes: sending an idle code block between such fault indication code blocks in adjacent periods.

With reference to the first aspect, in a first possible implementation, the periodically sending a fault indication code block to a flexible Ethernet client corresponding to the at least one physical layer entity in which the fault occurs includes: when the fault is detected, consecutively sending a plurality of fault indication code blocks to the flexible Ethernet client corresponding to the at least one physical layer entity in which the fault occurs, periodically sending the fault indication code block to the flexible Ethernet client corresponding to the at least one physical layer entity in which the fault occurs, and sending an idle code block between such fault indication code blocks in adjacent periods.

With reference to the first aspect, in the foregoing possible implementation, the fault indication code block includes a control type field and a fault identification field which is used to indicate that a fault occurs in a physical layer entity.

With reference to the first aspect, in the foregoing possible implementation, the fault indication code block further includes a fault type identification field, the fault type identification field is used to indicate a fault type of the fault occurred in the at least one physical layer entity, and the fault type includes: the physical layer entity loses a signal, the physical layer entity cannot lock a code block, the physical layer entity cannot lock an alignment code block, and a high bit error rate alarm is detected in the physical layer entity. Optionally, the fault type may alternatively be: an alarm indicating that a physical coding sublayer is in a fault state; a physical layer entity/instance loses flexible Ethernet group frame lock or multiframe lock; physical layer entity/instance mapping tables, physical layer entity/instance numbers, or flexible Ethernet group numbers carried during frame lock or multiframe lock are inconsistent; or a receive clock skew between a plurality of physical layer entities/instances in a flexible Ethernet group is excessively large and exceeds a range allowed by a chip.

With reference to the first aspect, in the foregoing possible implementation, the fault indication code block is a service layer alarm indication code block, and the service layer alarm indication code block is defined based on any field reserved in an IEEE 802.3 standard specification for a standard Ethernet.

With reference to the first aspect, in the foregoing possible implementation, whether the fault in the at least one physical layer entity included in the flexible Ethernet group disappears is detected; and when the fault in the at least one physical layer entity disappears, the fault indication code block is stopped from being sent to the flexible Ethernet client corresponding to the at least one physical layer entity in which the fault occurs.

According to a second aspect, an embodiment of the present subject matter provides a method for indicating a fault. The method includes: detecting whether a flexible Ethernet client signal includes a fault indication code block; and when a predetermined fault indication code block is detected, continuously sending a fault signal to a user-network interface corresponding to the flexible Ethernet client signal.

In the foregoing technical solution, the fault indication code block may be detected, and a capability, of flexible Ethernet, of notifying a node outside a network that a fault occurs in a physical layer entity in a flexible Ethernet group in the network is retained.

With reference to the second aspect, in the foregoing possible implementation, after the predetermined fault indication code block is detected, the fault indication code block is continuously detected; and when no fault indication code block is detected, the fault signal is stopped from being sent to the user-network interface.

In the foregoing technical solution, if no fault indication code block is detected, the fault signal is stopped from being sent, thereby quickly enabling the exchange functions of a flexible Ethernet client and a user side to continue to exchange information.

With reference to the second aspect, in the foregoing possible implementation, the fault indication code block includes a control type field and a fault identification field which is used to indicate that a fault occurs in a physical layer entity.

With reference to the second aspect, in the foregoing possible implementation, the fault indication code block further includes a fault type identification field, the fault type identification field is used to indicate a fault type of the fault occurred in the at least one physical layer entity, and the fault type includes: the physical layer entity loses a signal, the physical layer entity cannot lock a code block, the physical layer entity cannot lock an alignment code block, and a high bit error rate alarm is detected in the physical layer entity. Optionally, the fault type may alternatively be: an alarm indicating that a physical coding sublayer is in a fault state; a physical layer entity/instance loses flexible Ethernet group frame lock or multiframe lock; physical layer entity/instance mapping tables, physical layer entity/instance numbers, or flexible Ethernet group numbers carried during frame lock or multiframe lock are inconsistent; or a receive clock skew between a plurality of physical layer entities/instances in a flexible Ethernet group is excessively large and exceeds a range allowed by a chip.

With reference to the second aspect, in the foregoing possible implementation, the fault indication code block is a service layer alarm indication code block, and the service layer alarm indication code block is defined based on any field reserved in an IEEE 802.3 standard specification for a standard Ethernet.

With reference to the second aspect, in the foregoing possible implementation, that a predetermined fault indication code block is detected means that one fault indication code block is detected, fault indication code blocks whose quantity is greater than a preset threshold are detected in a predetermined quantity of received code blocks, or fault indication code blocks whose quantity is greater than a preset threshold are detected within a predetermined time. That no fault indication code block is detected means that no fault indication code block or fault indication code blocks whose quantity is less than the preset threshold are detected in the predetermined quantity of received code blocks, or no fault indication code block or fault indication code blocks whose quantity is less than the preset threshold are detected within the predetermined time.

With reference to the second aspect, in the foregoing possible implementation, the fault signal is any one of a local fault signal, a multiplex section alarm indication signal, an optical data unit alarm indication signal, and a common public radio frequency interface-invalid synchronization control word signal.

According to a third aspect, an embodiment of the present subject matter provides an apparatus for indicating a fault. The apparatus includes: a detection module, configured to detect whether a fault occurs in at least one physical layer entity included in a flexible Ethernet group; and a sending module, configured to: when a fault occurs in the at least one physical layer entity, periodically send a fault indication code block to a flexible Ethernet client corresponding to the at least one physical layer entity in which the fault occurs.

In the foregoing technical solution, when a fault occurs in a physical layer entity, a fault indication code block is sent to the flexible Ethernet client corresponding to the at least one physical layer entity in which the fault occurs. In other words, instead of a solution in which a local fault signal is continuously sent to each flexible Ethernet client carried on a flexible Ethernet group immediately after a fault occurs in a physical layer entity, the fault indication code block is sent to the flexible Ethernet client corresponding to the at least one physical layer entity in which the fault occurs. Therefore, not all bandwidth of a downstream transmission path in the flexible Ethernet is occupied, and data transmission carried on a non-faulty channel in the same flexible Ethernet group is not affected, thereby reducing a quantity of affected flexible Ethernet clients.

With reference to the third aspect, in a first possible implementation, the periodically sending a fault indication code block to a flexible Ethernet client corresponding to the at least one physical layer entity in which the fault occurs includes: sending an idle code block between such fault indication code blocks in adjacent periods.

With reference to the third aspect, in a first possible implementation, the periodically sending a fault indication code block to a flexible Ethernet client corresponding to the at least one physical layer entity in which the fault occurs includes: when the fault is detected, consecutively sending a plurality of fault indication code blocks to the flexible Ethernet client corresponding to the at least one physical layer entity in which the fault occurs, periodically sending the fault indication code block to the flexible Ethernet client corresponding to the at least one physical layer entity in which the fault occurs, and sending an idle code block between such fault indication code blocks in adjacent periods.

With reference to the third aspect, in the foregoing possible implementation, the fault indication code block includes a control type field and a fault identification field which is used to indicate that a fault occurs in a physical layer entity.

With reference to the third aspect, in the foregoing possible implementation, the fault indication code block further includes a fault type identification field, the fault type identification field is used to indicate a fault type of the fault occurred in the at least one physical layer entity, and the fault type includes: the physical layer entity loses a signal, the physical layer entity cannot lock a code block, the physical layer entity cannot lock an alignment code block, and a high bit error rate alarm is detected in the physical layer entity. Optionally, the fault type may alternatively be: an alarm indicating that a physical coding sublayer is in a fault state; a physical layer entity/instance loses flexible Ethernet group frame lock or multiframe lock; physical layer entity/instance mapping tables, physical layer entity/instance numbers, or flexible Ethernet group numbers carried during frame lock or multiframe lock are inconsistent; or a receive clock skew between a plurality of physical layer entities/instances in a flexible Ethernet group is excessively large and exceeds a range allowed by a chip.

With reference to the third aspect, in the foregoing possible implementation, the fault indication code block is a service layer alarm indication code block, and the service layer alarm indication code block is defined based on any field reserved in an IEEE 802.3 standard specification for a standard Ethernet.

With reference to the third aspect, in the foregoing possible implementation, the detection module is further configured to detect whether the fault in the at least one physical layer entity included in the flexible Ethernet group disappears. The sending module is further configured to: when the fault in the at least one physical layer entity disappears, stop sending the fault indication code block to the flexible Ethernet client corresponding to the at least one physical layer entity in which the fault occurs.

In the foregoing technical solution, if the fault in the physical layer entity disappears, the fault indication code block is stopped from being sent, to notify a downstream device that a link fault is rectified and the link is restored to normal.

According to a fourth aspect, an embodiment of the present subject matter provides an apparatus for indicating a fault. The apparatus includes: a detection module, configured to detect whether the flexible Ethernet client signal includes a fault indication code block; and a sending module, configured to: when a predetermined fault indication code block is detected, continuously send a fault signal to a user-network interface corresponding to the flexible Ethernet client signal.

In the foregoing technical solution, the fault indication code block may be detected, and a capability, of flexible Ethernet, of notifying a node outside a network that a fault occurs in a physical layer entity in a flexible Ethernet group in the network is retained.

With reference to the fourth aspect, in the foregoing possible implementation, the detection module is further configured to: after the predetermined fault indication code block is detected, continuously detect the fault indication code block. The sending module is further configured to: when no fault indication code block is detected by the detection module, stop sending the fault signal to the user-network interface.

In the foregoing technical solution, if no fault indication code block is detected, the fault signal is stopped from being sent, thereby quickly enabling the exchange functions of a flexible Ethernet client and a user side to continue to exchange information.

With reference to the fourth aspect, in the foregoing possible implementation, the fault indication code block includes a control type field and a fault identification field which is used to indicate that a fault occurs in a physical layer entity.

With reference to the fourth aspect, in the foregoing possible implementation, the fault indication code block further includes a fault type identification field, the fault type identification field is used to indicate a fault type of the fault occurred in the at least one physical layer entity, and the fault type includes: the physical layer entity loses a signal, the physical layer entity cannot lock a code block, the physical layer entity cannot lock an alignment code block, and a high bit error rate alarm is detected in the physical layer entity. Optionally, the fault type may alternatively be: an alarm indicating that a physical coding sublayer is in a fault state; a physical layer entity/instance loses flexible Ethernet group frame lock or multiframe lock; physical layer entity/instance mapping tables, physical layer entity/instance numbers, or flexible Ethernet group numbers carried during frame lock or multiframe lock are inconsistent; or a receive clock skew between a plurality of physical layer entities/instances in a flexible Ethernet group is excessively large and exceeds a range allowed by a chip.

With reference to the fourth aspect, in the foregoing possible implementation, the fault indication code block is a service layer alarm indication code block, and the service layer alarm indication code block is defined based on any field reserved in an IEEE 802.3 standard specification for a standard Ethernet.

With reference to the fourth aspect, in the foregoing possible implementation, that a predetermined fault indication code block is detected means that one fault indication code block is detected, fault indication code blocks whose quantity is greater than a preset threshold are detected in a predetermined quantity of received code blocks, or fault indication code blocks whose quantity is greater than a preset threshold are detected within a predetermined time. That no fault indication code block is detected means that no fault indication code block or fault indication code blocks whose quantity is less than the preset threshold are detected in the predetermined quantity of received code blocks, or no fault indication code block or fault indication code blocks whose quantity is less than the preset threshold are detected within the predetermined time.

With reference to the fourth aspect, in the foregoing possible implementation, the fault signal is any one of a local fault signal, a multiplex section alarm indication signal, an optical data unit alarm indication signal, and a common public radio frequency interface-invalid synchronization control word signal.

According to a fifth aspect, an embodiment of the present subject matter provides a network device, including the apparatus according to any possible implementation of the third aspect and the apparatus according to any possible implementation of the fourth aspect.

According to a sixth aspect, an embodiment of the present subject matter provides a network device, including the apparatus according to any possible implementation of the third aspect.

According to a seventh aspect, an embodiment of the present subject matter provides a computer-readable storage medium. The computer-readable storage medium stores an instruction, and the instruction is executed by a computer to implement the method according to the foregoing aspects.

According to an eighth aspect, an embodiment of the present subject matter provides a computer program product including an instruction. When running on a computer, the computer program product enables the computer to perform the method according to the foregoing aspects.

According to a ninth aspect, an embodiment of the present subject matter provides a computer program. When running on a computer, the computer program enables the computer to perform the method according to the foregoing aspects.

BRIEF DESCRIPTION OF DRAWINGS

FIG. 10 is a schematic diagram of slot allocation in a FlexE group including four physical interfaces according to an embodiment of the present subject matter;

FIG. 11 is a flowchart of a method for indicating a fault according to an embodiment of the present subject matter;

FIG. 12 is a schematic diagram of an idle code block according to an embodiment of the present subject matter;

FIG. 13 is a schematic diagram of an example of an SLAI code block according to an embodiment of the present subject matter;

DESCRIPTION OF EMBODIMENTS

Figure 1:
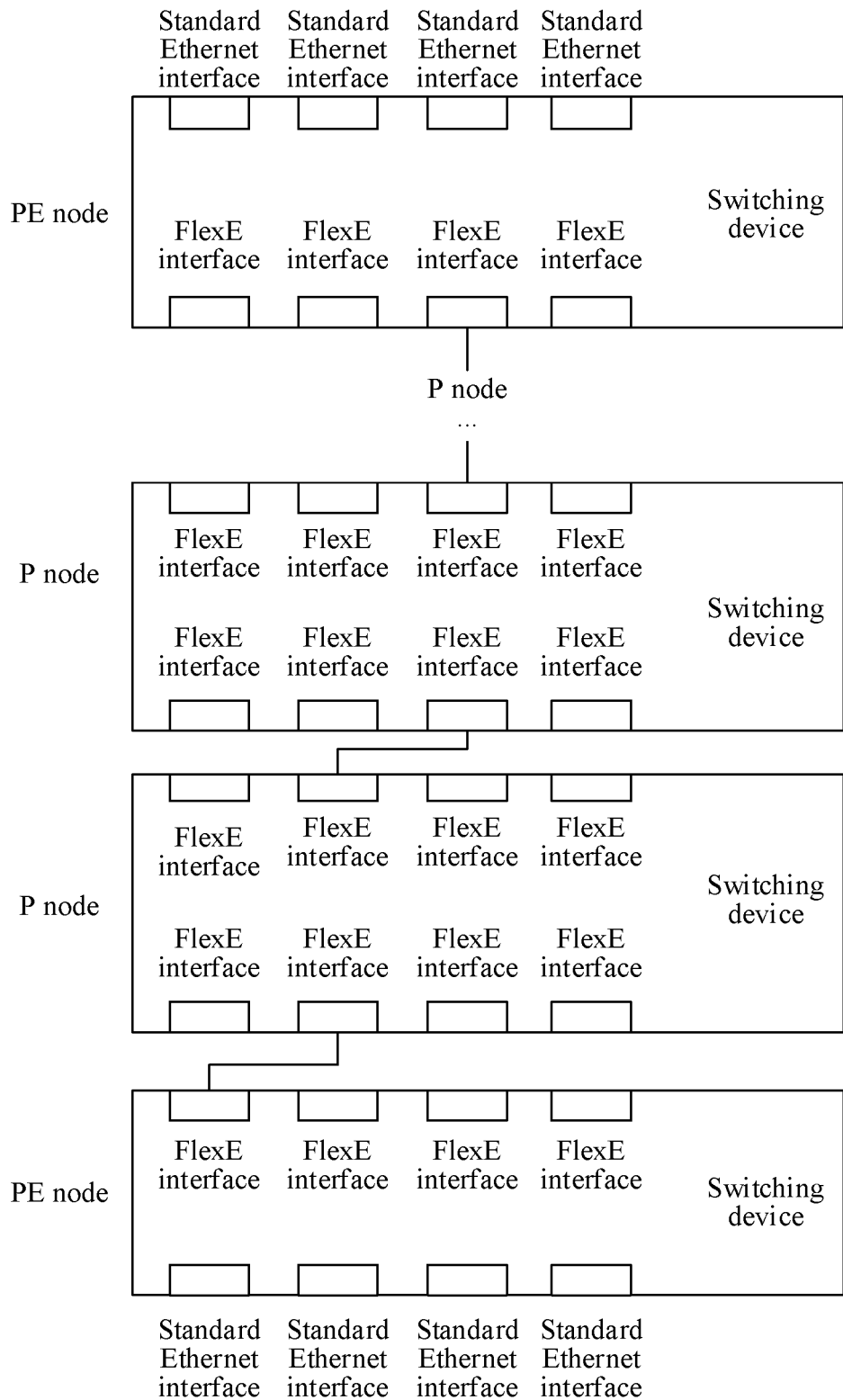
FIG. 1 is a schematic application diagram of a signal transmission device in FlexE according to an embodiment of the present subject matter.

The technical solutions in embodiments of the present subject matter are applied to a multi-node network that is based on a FlexE technology. FIG. 1 is a schematic application diagram of a signal transmission device in FlexE according to an embodiment of the present subject matter.

FIG. 1 shows a network including a provider edge (PE) node and a provider (P) node. The PE node is a network device connected to a user at a network edge, and the PE node is equipped with a network-to-network interface (NNI) and a user-network interface (UNI). The P node is a network device in a network and is equipped with only an NNI. Both the PE node and the P node may be referred to as switching devices or switch devices. The PE node in FIG. 1 is connected to customer equipment through a standard Ethernet interface, and P nodes are connected to each other through a FlexE interface.

However, the standard Ethernet interface herein is only an example. Alternatively, the PE node may be connected to a synchronous digital hierarchy (SDH) network through an SDH interface, connected to an optical transport network (OTN) network through an OTN interface, connected to a common public radio frequency interface (common public radio interface, CPRI) network through a CPRI, or connected to another user equipment through another user equipment interface.

Figure 2:
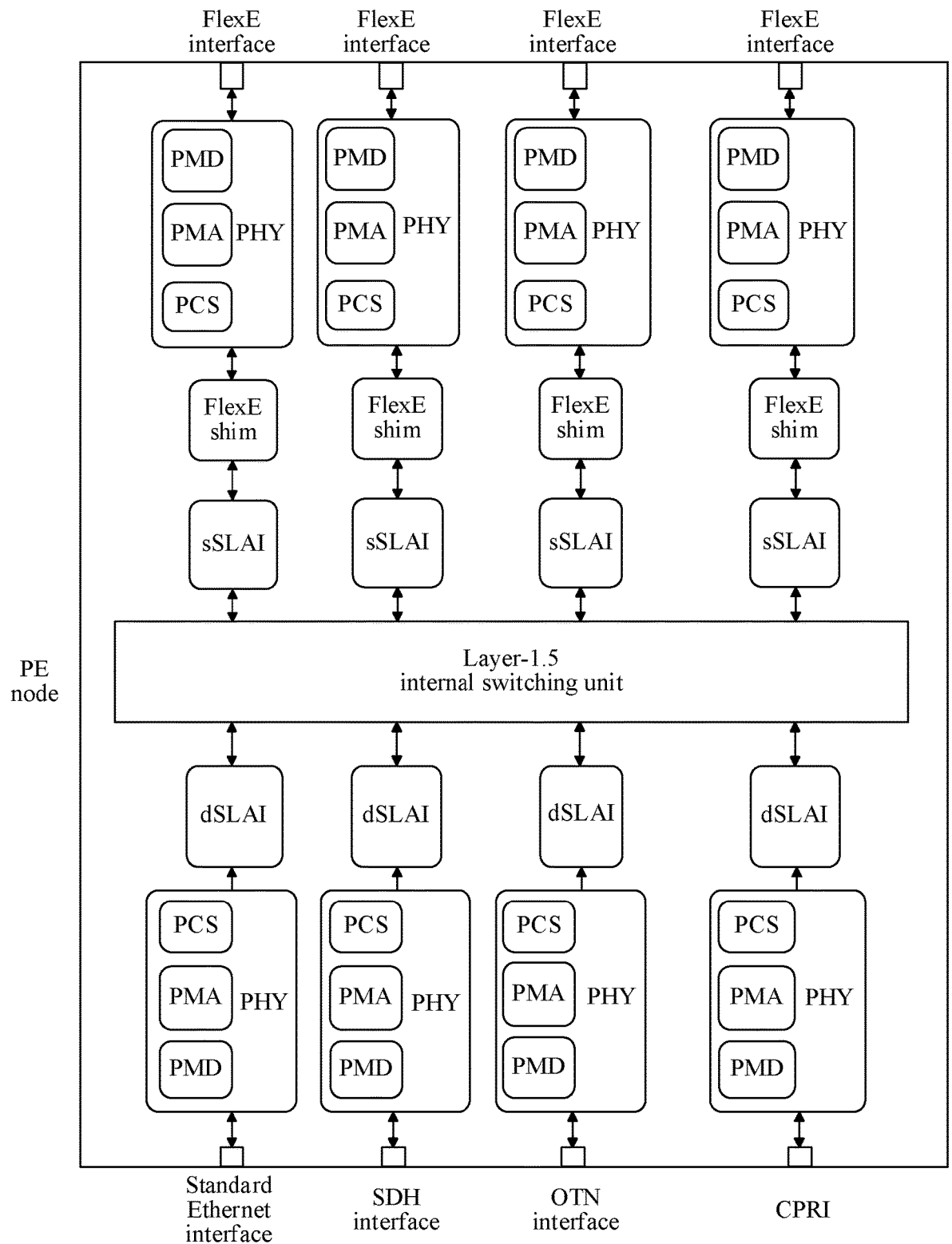
FIG. 2 is a schematic structural diagram of a PE node according to an embodiment of the present subject matter.

FIG. 2 is a schematic structural diagram of a PE node according to an embodiment of the present subject matter. The PE node has a plurality of transmission paths from UNIs such as a standard Ethernet interface, an SDH interface, an OTN interface, and a CPRI to a FlexE interface. For simplicity, the following uses the standard Ethernet interface as an example for description. Devices in all transmission paths are the same. The standard Ethernet interface is connected to a physical layer entity (PHY), and a detector-server layer alarm indication (dSLAI) is connected to both the PHY and a layer-1.5 internal switching unit. An end of a service-server layer alarm indication (sSLAI) is connected to the layer-1.5 internal switching unit. The other end of the sSLAI is connected to the FlexE interface sequentially through a flexible Ethernet shim (FlexE Shim) and the PHY The sSLAI/dSLAI is responsible for the generation and termination of a server layer alarm indication (SLAI) code block in the FlexE network. The SLAI code block herein is an example of a fault indication code block, and the following uses the SLAI code block as an example for description.

In the PE node, when a signal is transmitted from the standard Ethernet interface to the FlexE interface, the sSLAI detects whether there is a PHY fault. When a signal is transmitted from the FlexE interface to the standard Ethernet interface, the dSLAI detects whether there is an SLAI code block in a received signal stream.

The PHY specifically includes a physical medium dependent (PMD) sublayer, a physical medium attachment (PMA) sublayer, and a physical coding sublayer (PCS).

Layer 1.5 is a data transmission layer related to a FlexE protocol. The FlexE shim is responsible for mutual conversion from a standard Ethernet data flow to a FlexE slot data flow.

Figure 3:
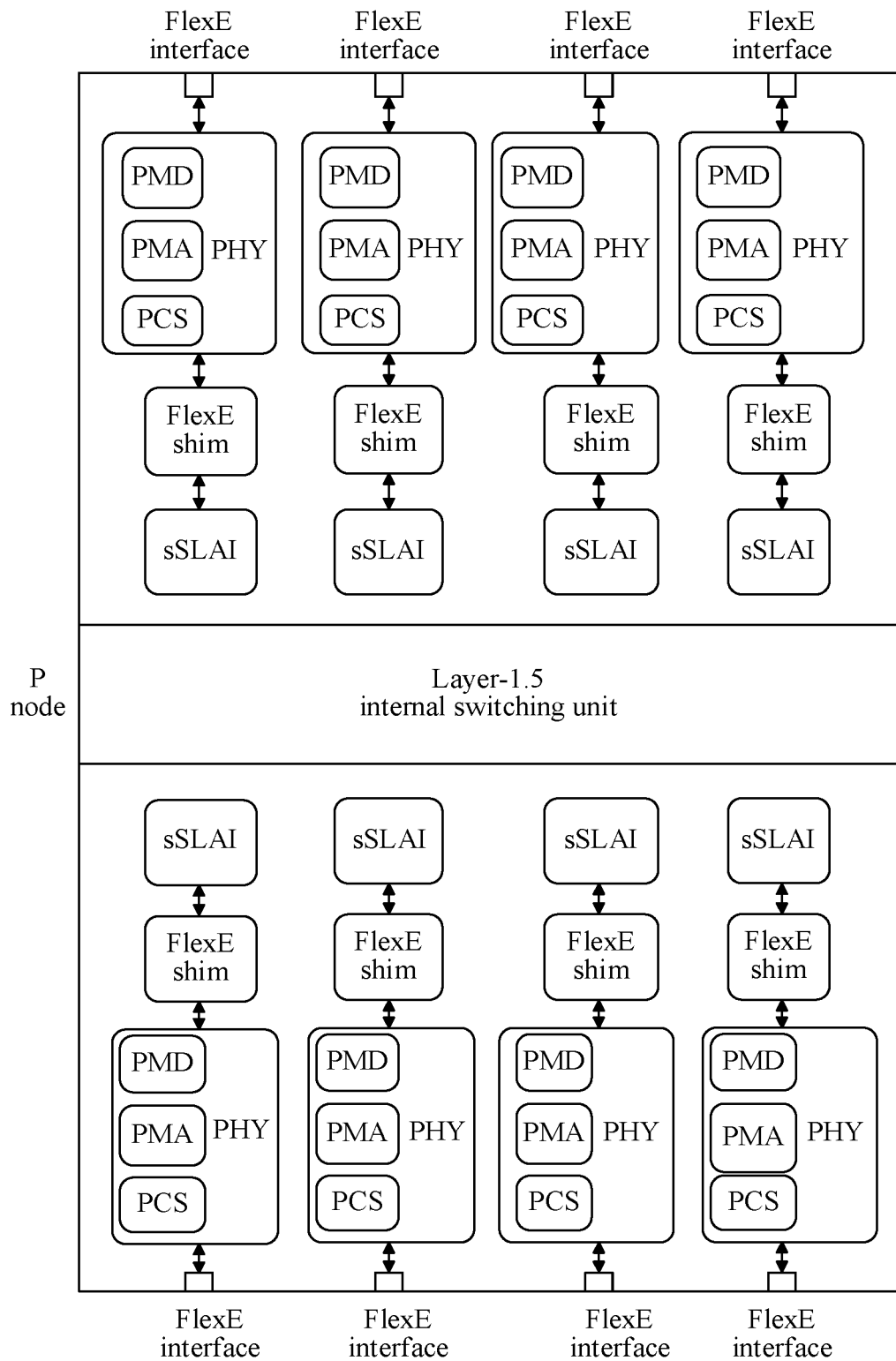
FIG. 3 is a schematic structural diagram of a P node according to an embodiment of the present subject matter.

FIG. 3 is a schematic structural diagram of a P node according to an embodiment of the present subject matter. The P node is equipped with only an NNI. A difference between the P node and the PE node lies in that the P node has two sSLAIs, and each sSLAI is connected to the PHY via a FlexE shim.

The technical solutions in the embodiments of the present subject matter may be implemented on a network device that supports layer-1.5 switching. Specifically, the network device is a switch device that supports the FlexE interface.

In terms of structure, the network device in the embodiments of the present subject matter may be a box switch or a chassis switch. A dSLAI function may be added to a user-network interface chip of the network device, and an sSLAI function may be added to a network-to-network interface chip of the network device.

Figure 4:
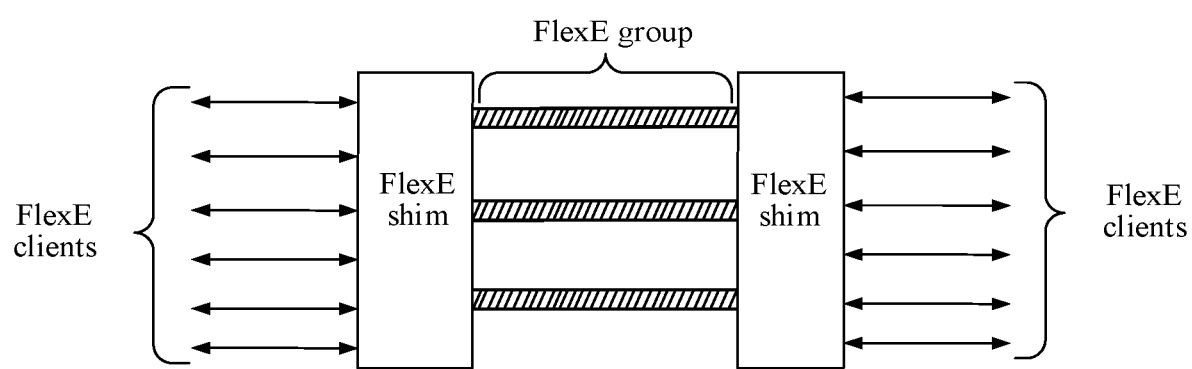
FIG. 4 is a schematic diagram of a FlexE group carrying a plurality of FlexE clients according to an embodiment of the present subject matter.

FIG. 4 is a schematic diagram of a FlexE group carrying a plurality of FlexE clients. One FlexE group carries a plurality of FlexE clients. In other words, the FlexE shim multiplexes and maps a plurality of FlexE clients to one FlexE group. In addition, the FlexE shim may de-map and de-multiplex a FlexE group, to restore a plurality of FlexE clients from the FlexE group.

Figure 5:
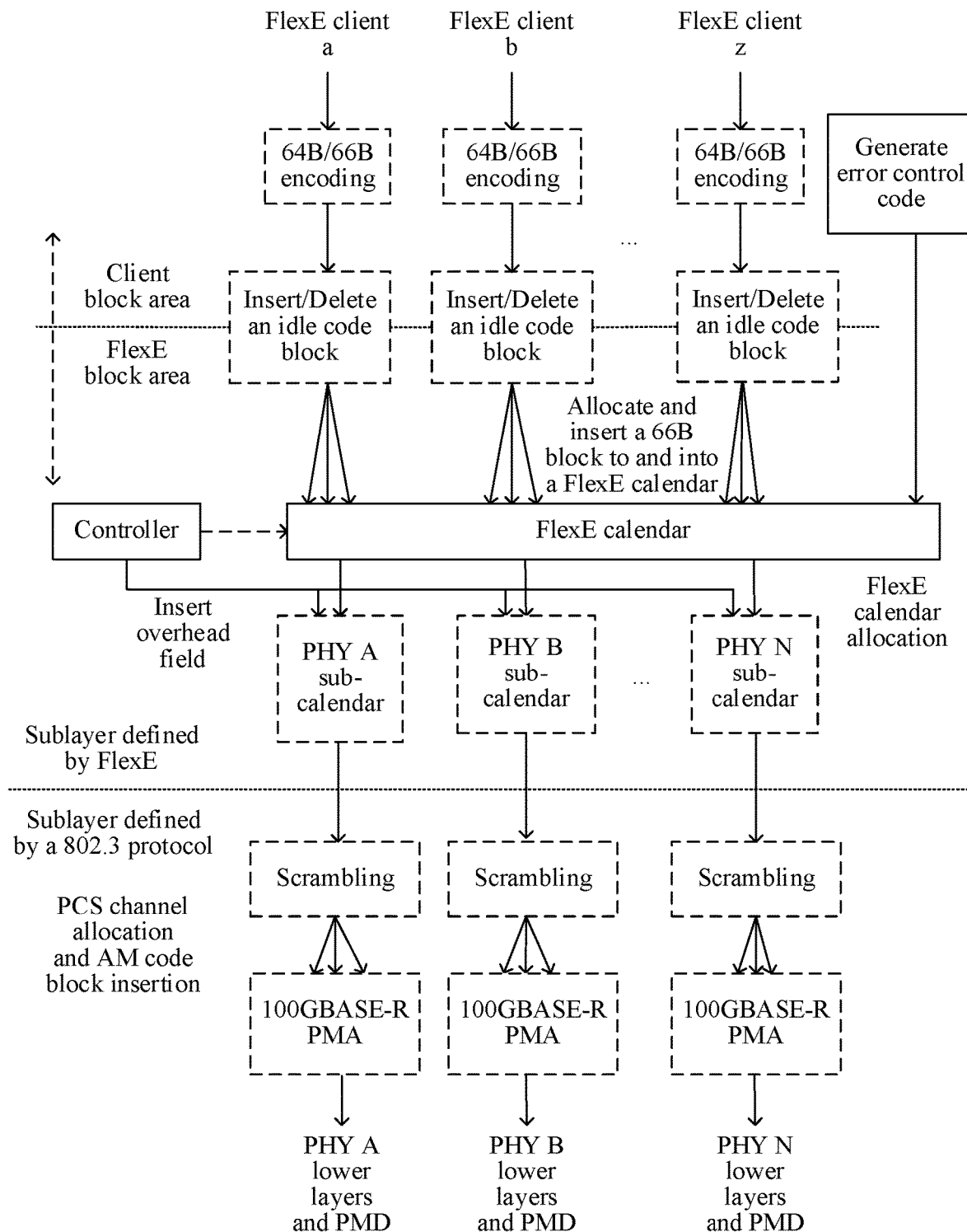
FIG. 5 is a schematic diagram of mapping and multiplexing in FlexE based on Nx100 G PHYs in OIF FlexE 1.0 according to an embodiment of the present subject matter.

FIG. 5 is a schematic diagram of mapping and multiplexing in FlexE based on Nx100 G PHYs in OIF FlexE 1.0 according to an embodiment of the present subject matter. As shown in FIG. 5, in a client block area, an idle code block (IDLE code block) is inserted/deleted from data that is of a FlexE client a to a FlexE client z and that includes 64 B/66 B encoded data, to implement clock synchronization in a FlexE block area. In addition, slot allocation is performed, by using a FlexE calendar corresponding to the FlexE group, on a data code block for which clock synchronization has been completed, and the data code block is transmitted by using each sub-calendar after an overhead (overhead) field is inserted by a control part. After being scrambled, a PCS channel is allocated to and an AM (alignment marker) code block is inserted into transmission data, and the transmission data is transmitted in a physical layer sequentially through a PMA and a PMD. When a PHY fault occurs, a fault control block is generated and is transmitted downstream together with a transmission data signal.

Figure 6:
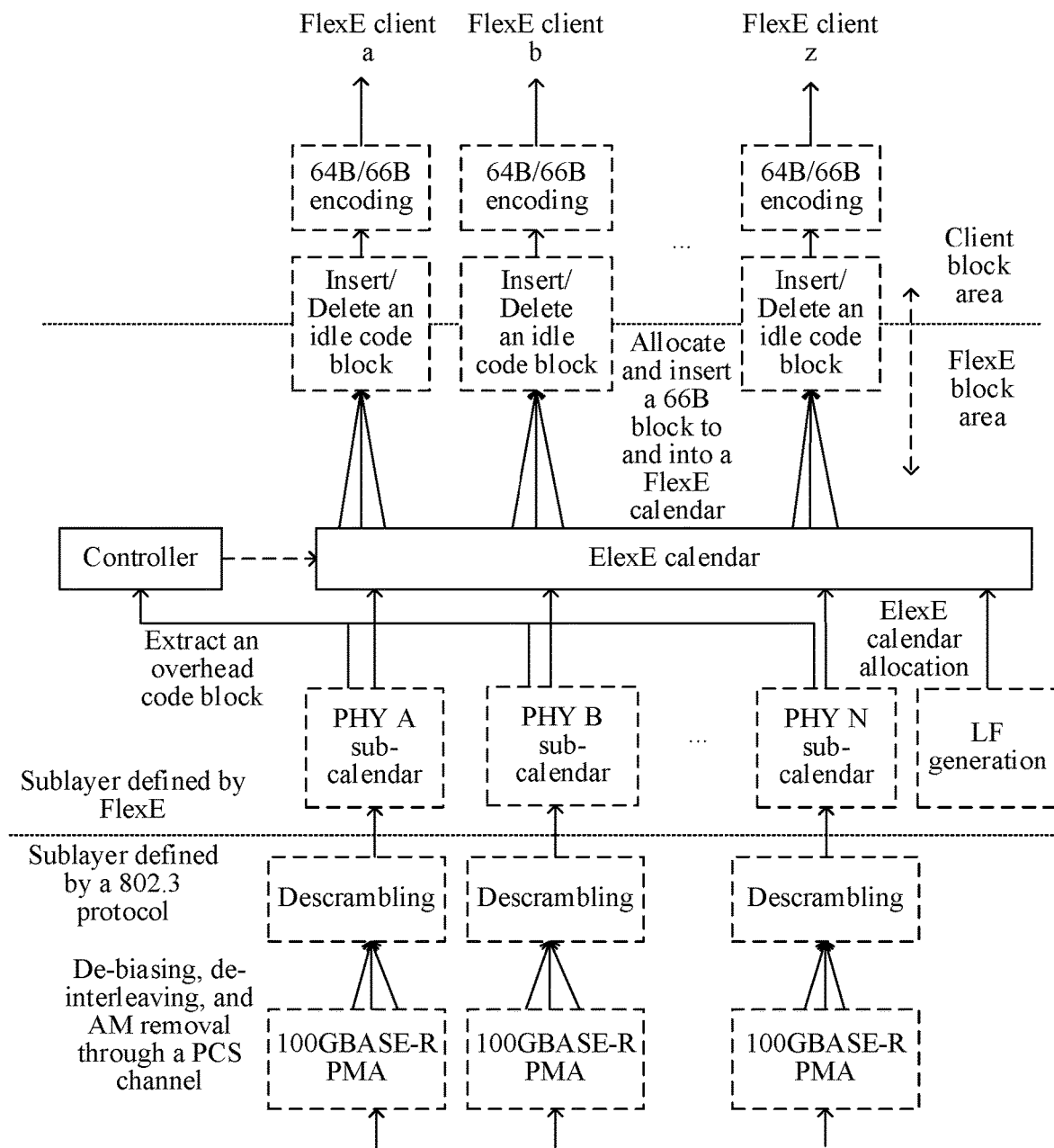
FIG. 6 is a schematic diagram of de-mapping and de-multiplexing in FlexE based on Nx100 G PHYs in OIF FlexE 1.0 according to an embodiment of the present subject matter.

FIG. 6 is a schematic diagram of de-mapping and de-multiplexing in FlexE based on Nx100 G PHYs in OIF FlexE 1.0 according to an embodiment of the present subject matter. A de-mapping and de-multiplexing process performed by the FlexE shim is basically in reverse order of a mapping and multiplexing process. The FlexE shim de-biases, de-interleaves, removes an AM code block from, and then de-scrambles input data through a PCS channel. De-scrambled transmission data from a PHY is transmitted by using each sub-calendar, overhead is extracted from the de-scrambled transmission data, and then each FlexE client is restored from a FlexE calendar. In this process, when a PHY fault occurs, a local fault (LF) signal is generated in a sublayer (sublayers) defined by the FlexE, to notify a downstream device and a device outside the network that the PHY fault exists.

After evolving from version 1.0 to version 2.0, the OIF FlexE specifies that a 100 G PHY carries one FlexE instance (Instance), a 200 G PHY carries two FlexE instances, and a 400 G PHY carries four FlexE instances.

Figure 7:
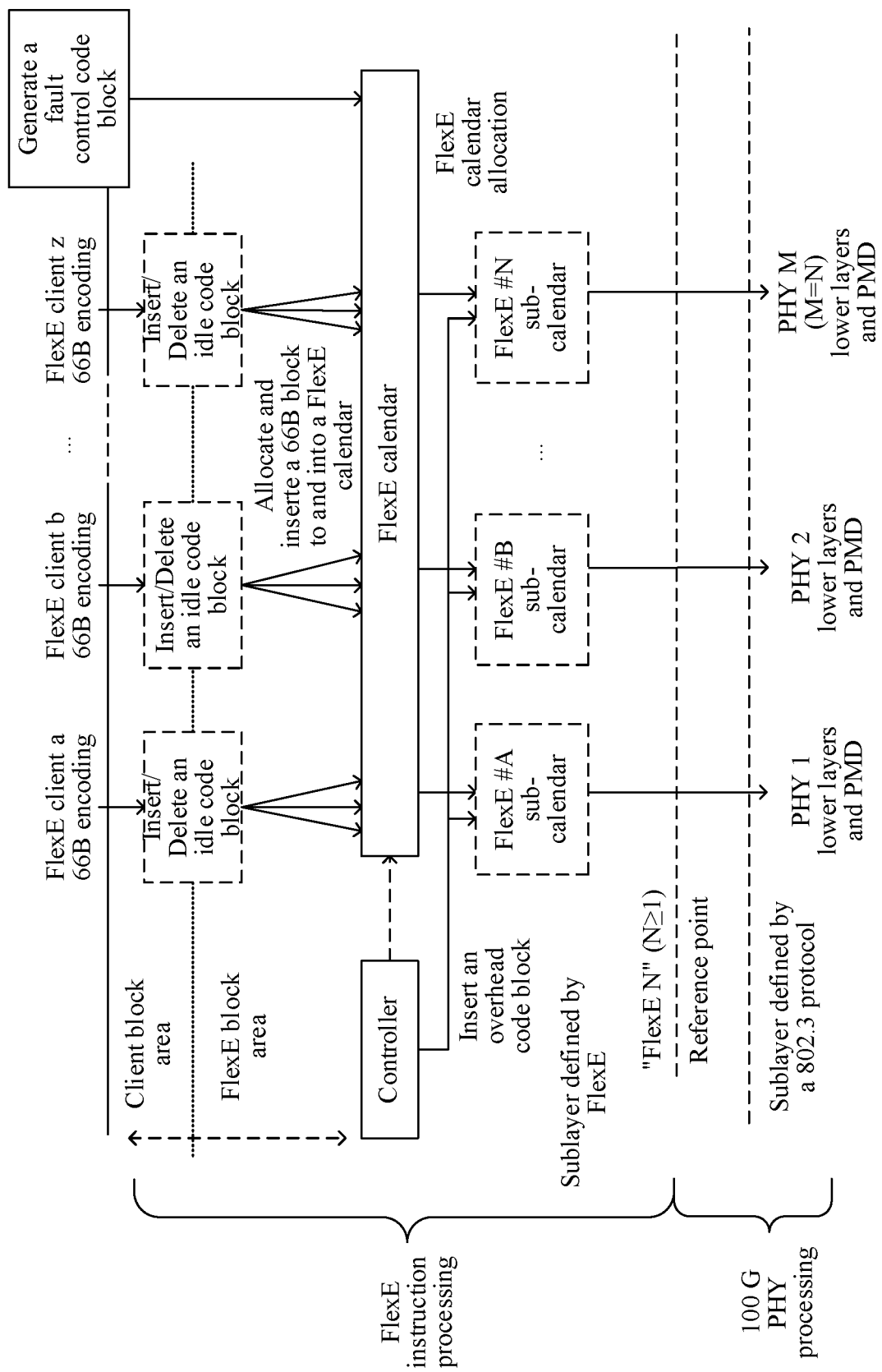
FIG. 7 is a schematic diagram of mapping and multiplexing in FlexE based on Mx100 G PHYs in OIF FlexE 2.0 according to an embodiment of the present subject matter.
Figure 8:
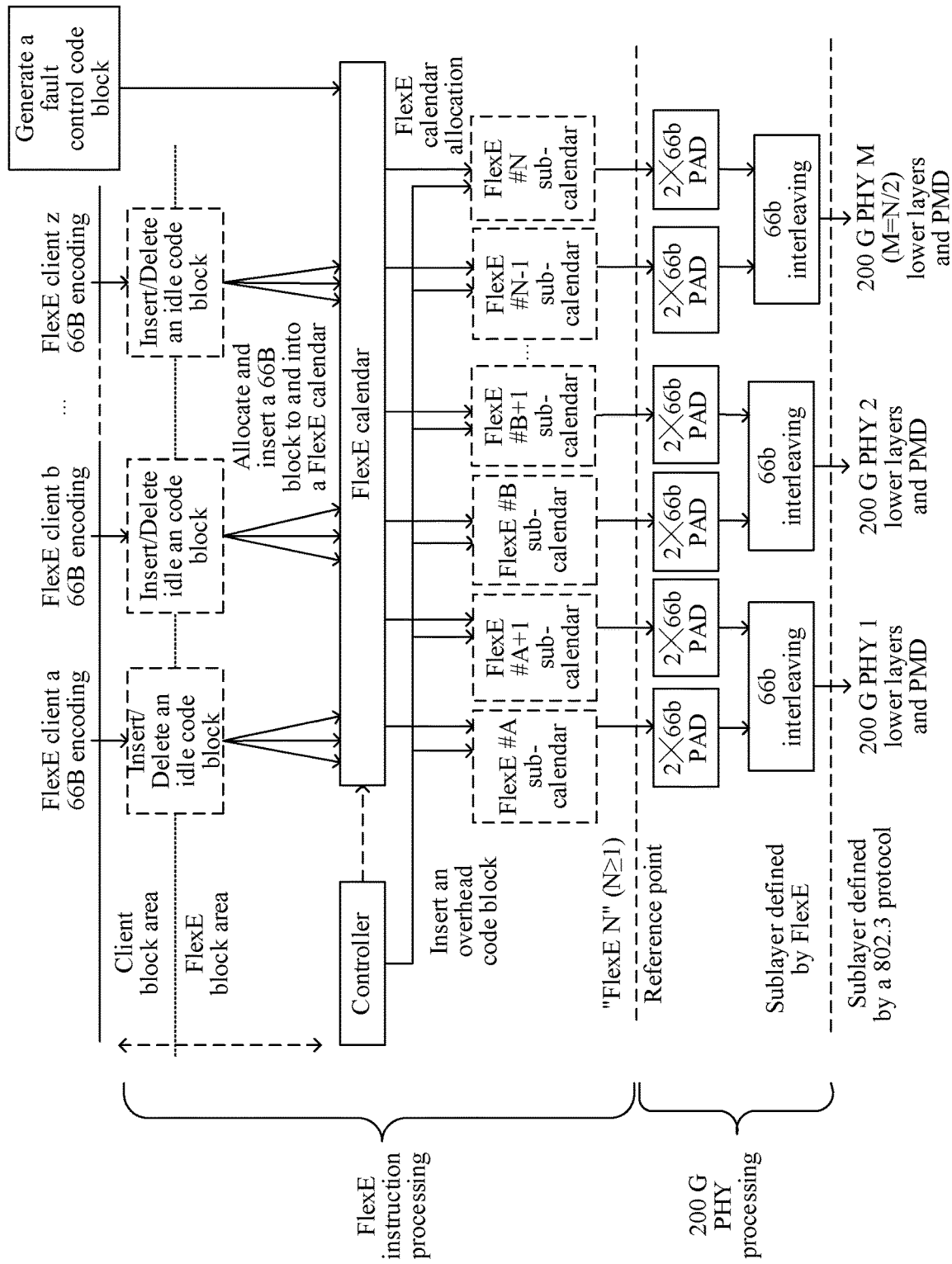
FIG. 8 is a schematic diagram of mapping and multiplexing in FlexE based on Mx200 G PHYs in OIF FlexE 2.0 according to an embodiment of the present subject matter.
Figure 9:
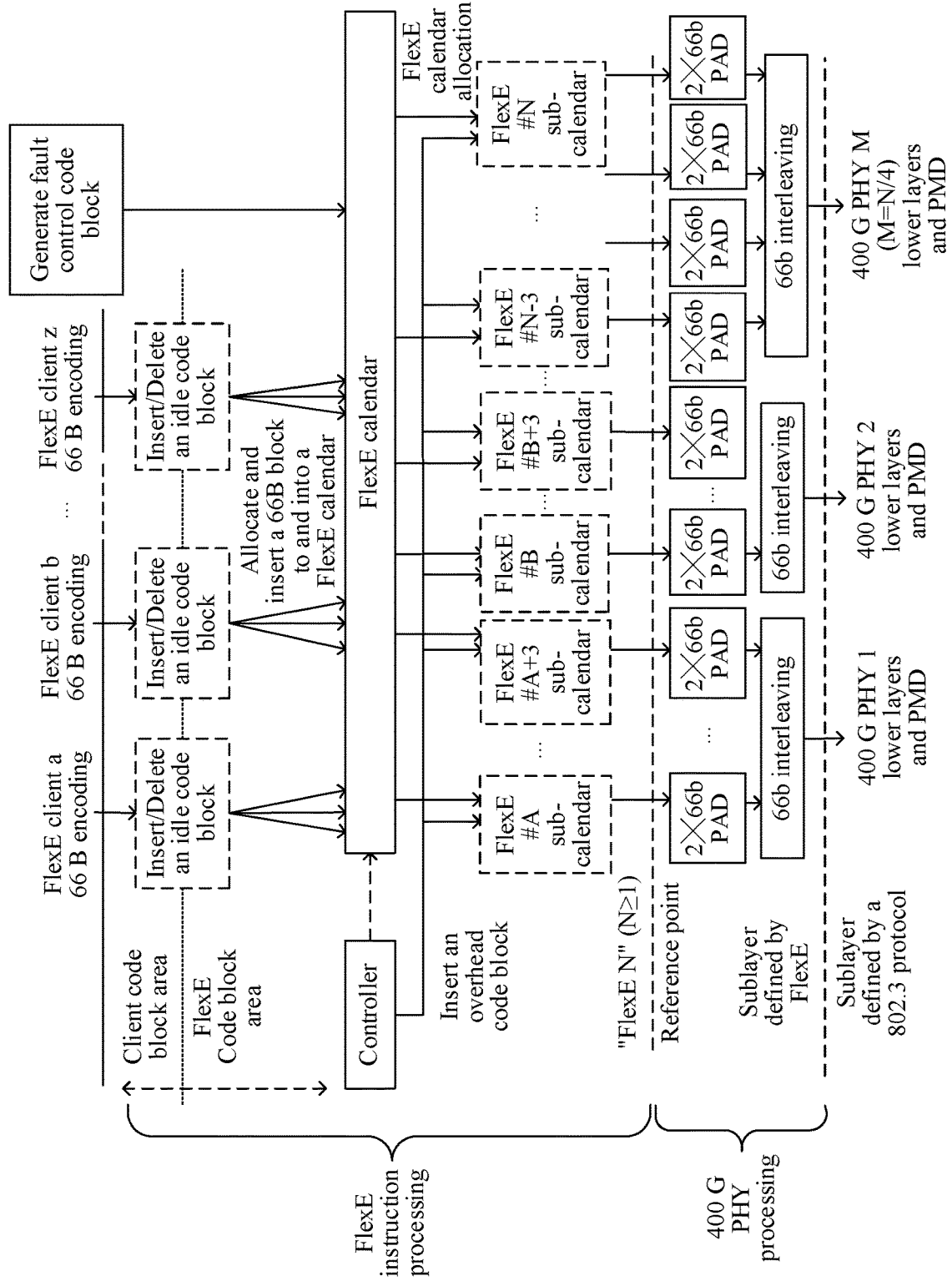
FIG. 9 is a schematic diagram of mapping and multiplexing in FlexE based on Mx400 G PHYs in OIF FlexE 2.0 according to an embodiment of the present subject matter.

FIG. 7 is a schematic diagram of mapping and multiplexing in FlexE based on Mx100 G PHYs in OIF FlexE 2.0 according to an embodiment of the present subject matter. FIG. 8 is a schematic diagram of mapping and multiplexing in FlexE based on Mx200 G PHYs in OIF FlexE 2.0 according to an embodiment of the present subject matter. FIG. 9 is a schematic diagram of mapping and multiplexing in FlexE based on Mx400 G PHYs in OIF FlexE 2.0 according to an embodiment of the present subject matter. Herein, in FIG. 7, M=N, and each 100 G PHY carries one FlexE instance. In FIG. 8, M=N/2, and each 200 G PHY carries two FlexE instances. For example, a 200 G PHY 1 carries FlexE #A and FlexE #A+1. In FIG. 9, M=N/4, and each 400 G PHY carries four FlexE instances. For example, a 400 G PHY 1 carries FlexE #A, FlexE #A+1, FlexE #A+2, and FlexE #A+3.

Using FIG. 8 as an example, a 200 G PHY carries two FlexE instances, namely, FlexE #A and FlexE #A+1. In FIG. 8, in a client block area, an idle code block is inserted/deleted from 66 B encoded data of FlexE clients a, . . . , and z, to implement clock synchronization in a FlexE block area. The data code block on which clock synchronization has been performed is allocated to and inserted into a FlexE calendar, and FlexE #A, A+1, . . . , N−1, and N are transmitted by using all sub-calendars. After two 66 B code blocks are separately inserted into transmission data of every two corresponding groups of instances, for example, FlexE #A and FlexE #A+1, the transmission data is interleaved and is output via a PHY of a 200 G PHY network.

De-mapping and de-multiplexing in the FlexE in OIF FlexE 2.0 are reversely performed relative to processes in FIG. 7 to FIG. 9, and details are not described herein again.

FIG. 10 is a schematic diagram of slot allocation in a FlexE group including four physical interfaces. Each physical interface has 20 sub-slots (sub-calendar), and therefore the FlexE group has 20×4 sub-slots.

According to an OIF FlexE protocol standard, one FlexE group sends one FlexE overhead code block to a remote PHY every 20×1023 code blocks on each member PHY (1.0 standard) or instance (2.0). Eight FlexE overhead code blocks that are sequentially sent from one overhead frame (FlexE overhead frame), and thirty-two consecutive FlexE overhead frames form one multiframe (multiframe). The FlexE specifies that some fields of the overhead frame carry a slot allocation table, and the slot table is synchronized to the remote PHY by using the FlexE overhead frame, to ensure that both PHYs receive and send a FlexE client data flow by using a same slot allocation table.

Based on the foregoing descriptions, the FlexE group includes a FlexE client, a FlexE shim (FlexE Calendar), a PHY (OIF FlexE 1.0)/instance (OIF FlexE 2.0), and a link connection between PHYs. When a PHY fault occurs in a FlexE group that carries FlexE client data, a fault indication code block is to be transmitted to notify a downstream device and an external device.

The following describes technical solutions in the embodiments of the present subject matter in detail with reference to the accompanying drawings. FIG. 11 is a flowchart of a method for indicating a fault according to an embodiment of the present subject matter. The method is applied to FlexE, and specifically includes the following steps.

S111. Detect whether a fault occurs in at least one PHY included in a FlexE group.

A P node or a PE node in the FlexE network detects whether a PHY fault occurs in a FlexE group that transmits a signal. In a specific example, the P node or the PE node in the FlexE network may detect, by using an sSLAI, whether a PHY fault occurs in the FlexE group that transmits a signal.

The sSLAI determines that a PHY fault occurs when detecting any one of the following: A PHY loses a signal (loss of signal, LOS), a PHY fails to lock a code block (loss of block lock), a PHY fails to lock an alignment code block (loss of alignment marker lock), or a high bit error rate alarm signal is detected in a PHY S112. When a fault occurs in the at least one PHY, periodically send a fault indication code block to a FlexE client corresponding to the at least one PHY in which the fault occurs.

The PHY herein may be a PHY in OIF FlexE 1.0, or may be a PHY or a FlexE instance (FlexE Instance) corresponding to a PHY in OIF FlexE 2.0. The FlexE client corresponding to the PHY in which the fault occurs is a FlexE client in a downstream direction of signal transmission by the PHY in which the fault occurs.

Herein, an example in which the sSLAI sends an SLAI code block as the fault indication code block is used for description.

In the foregoing method, when a PHY fault occurs, for example, the sSLAI periodically sends an SLAI code block to the FlexE client corresponding to the at least one PHY that is carried on the FlexE group and in which the fault occurs. In the method, data transmission carried on a non-faulty channel of the same FlexE group is not affected, thereby reducing the number of affected FlexE clients. In addition, a plurality of paths of different signals are transmitted on channels of the same FlexE group without interfering with each other. Therefore, utilization of a communications line may be improved, and a capability of statistical multiplexing is provided for a downstream transmission path of an associated FlexE client channel of the same FlexE group in which a fault occurs. Moreover, because transmission of a data flow on a FlexE client channel carried by a non-faulty PHY in a FlexE group is not limited, a possibility of a protection switchover mechanism between a plurality of PHYs in the FlexE group is provided, and a fault self-healing mechanism at a FlexE group level is allowed.

The periodically sending, by the sSLAI, an SLAI code block to a FlexE client corresponding to the at least one PHY in which the fault occurs includes: sending an idle code block between such SLAI code blocks in adjacent periods. Alternatively, the sSLAI periodically sends an SLAI code block to a FlexE client corresponding to the at least one PHY in which the fault occurs, where when the fault is detected, first, a plurality of SLAI code blocks are consecutively sent to the FlexE client corresponding to the at least one PHY in which the fault occurs, then an SLAI code block is periodically sent to the FlexE client corresponding to the at least one PHY in which the fault occurs, and an idle code block is sent between such SLAI code blocks in adjacent periods.

In an example, the SLAI code block is periodically sent. For example, one SLAI code block may be sent every 30000 idle code blocks, or 100 SLAI code blocks may be sent every 30000 idle code blocks. Alternatively, the SLAI code block is periodically sent. For example, when a fault is detected in a PHY, 50 SLAI code blocks are sent first, then the SLAI code block is periodically sent, and an IIDLE code block is sent between such SLAI code blocks in adjacent periods.

FIG. 12 is a schematic diagram of an idle code block according to an embodiment of the present subject matter. Idle code block: a type of 64/66-bit block, where a synchronization header field is 10, a first control block byte is 0xIE, and subsequent eight consecutive seven bits (56 bits in total) are all 0x00.

Herein, the fault indication code block includes a control type field and a fault identification field which is used to indicate that a PHY fault occurs. Optionally, the fault indication code block may further include a fault type identification field, the fault type identification field is used to indicate a fault type of a fault occurring in the at least one PHY, and the fault type includes: the PHY loses a signal, the PHY cannot lock a code block, the PHY cannot lock an alignment code block, and a high-bit error rate alarm is detected in the PHY In addition, the fault type is not limited to the foregoing content. For example, the fault type may alternatively be any one of the following detected in the PHY: an alarm indicating that a PCS is in a fault state (PCS_status=FALSE); a PHY (OIF FlexE 1.0)/instance (OIF FlexE 2.0) loses FlexE group frame lock or multiframe lock; PHY (OIF FlexE 1.0)/instance (OIF FlexE 2.0) mapping tables, PHY (1.0)/instance (2.0) numbers, or FlexE group numbers carried during frame lock or multiframe lock are inconsistent; or a receive clock skew between a plurality of PHYs (OIF FlexE 1.0)/instances (OIF FlexE 2.0) in a FlexE group is excessively large and exceeds a range allowed by a chip. These are not listed one by one herein.

Optionally, the fault indication code block may be an SLAI code block. The SLAI code block is defined based on any reserved field specified in an IEEE 802.3 standard specification for a standard Ethernet. Specifically, FIG. 13 to FIG. 15 in the following show examples of an SLAI code block.

FIG. 13 is a schematic diagram of an example of an SLAI code block according to an embodiment of the present subject matter. As shown in FIG. 13, the SLAI code block uses a control code block, where a control type of the control code block is 0x4B, an O code is 0, D3 is 0 or any value between 3 and 255, and others are 0.

Figures 14, 15, 16, 17:
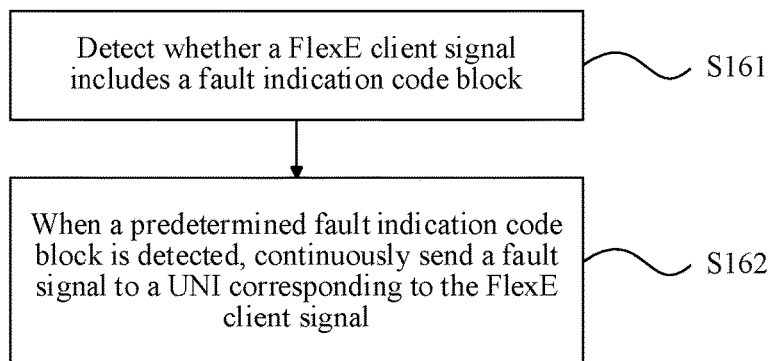
FIG. 14 is a schematic diagram of another example of an SLAI code block according to an embodiment of the present subject matter.
FIG. 15 is a schematic diagram of still another example of an SLAI code block according to an embodiment of the present subject matter.
FIG. 16 is a flowchart of a method for indicating a fault according to an embodiment of the present subject matter.
FIG. 17 is a schematic diagram of an LF code block according to an embodiment of the present subject matter.
Figure 18A:
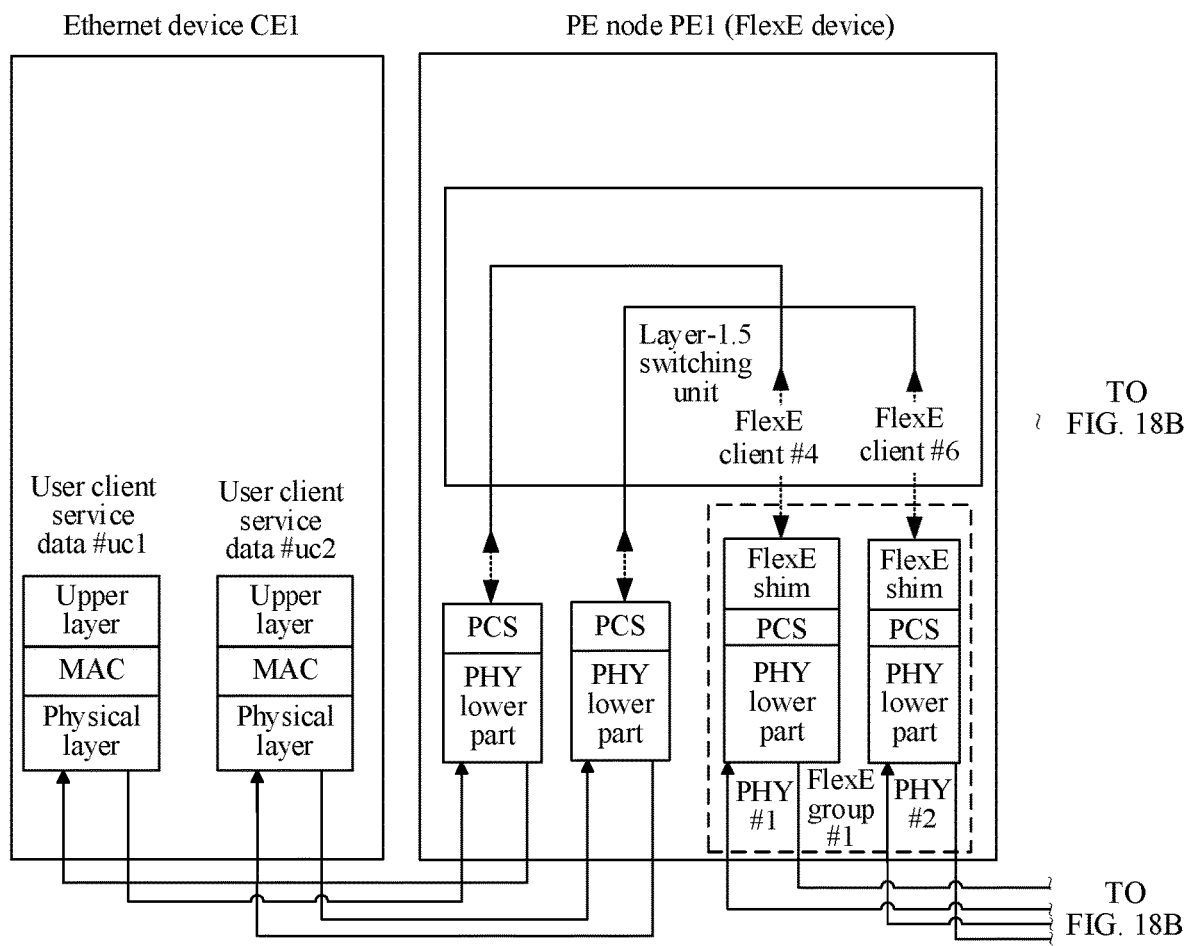
FIG. 18A to FIG. 18D are schematic diagrams of an example showing that a PHY fault occurs according to an embodiment of the present subject matter.
Figure 18B:
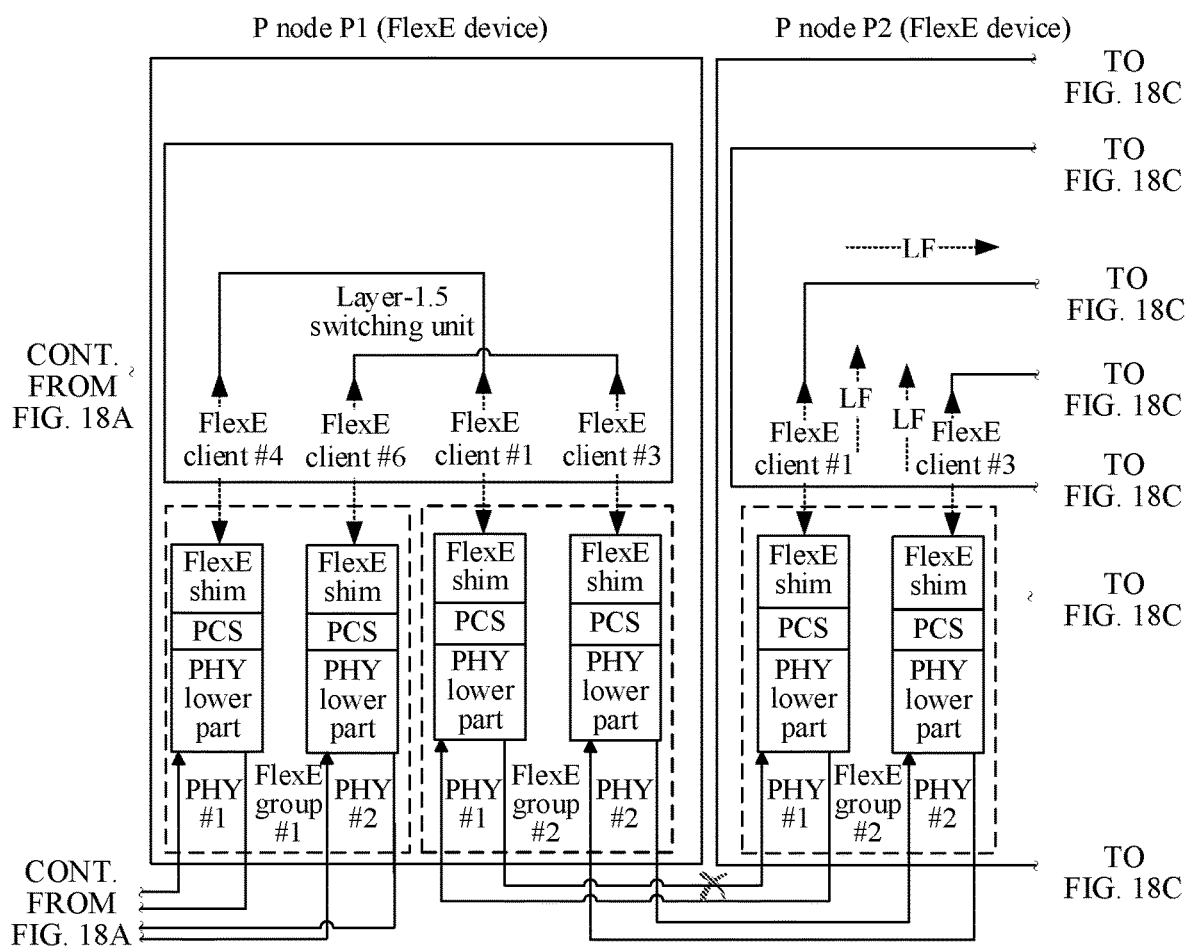
Figure 18C:
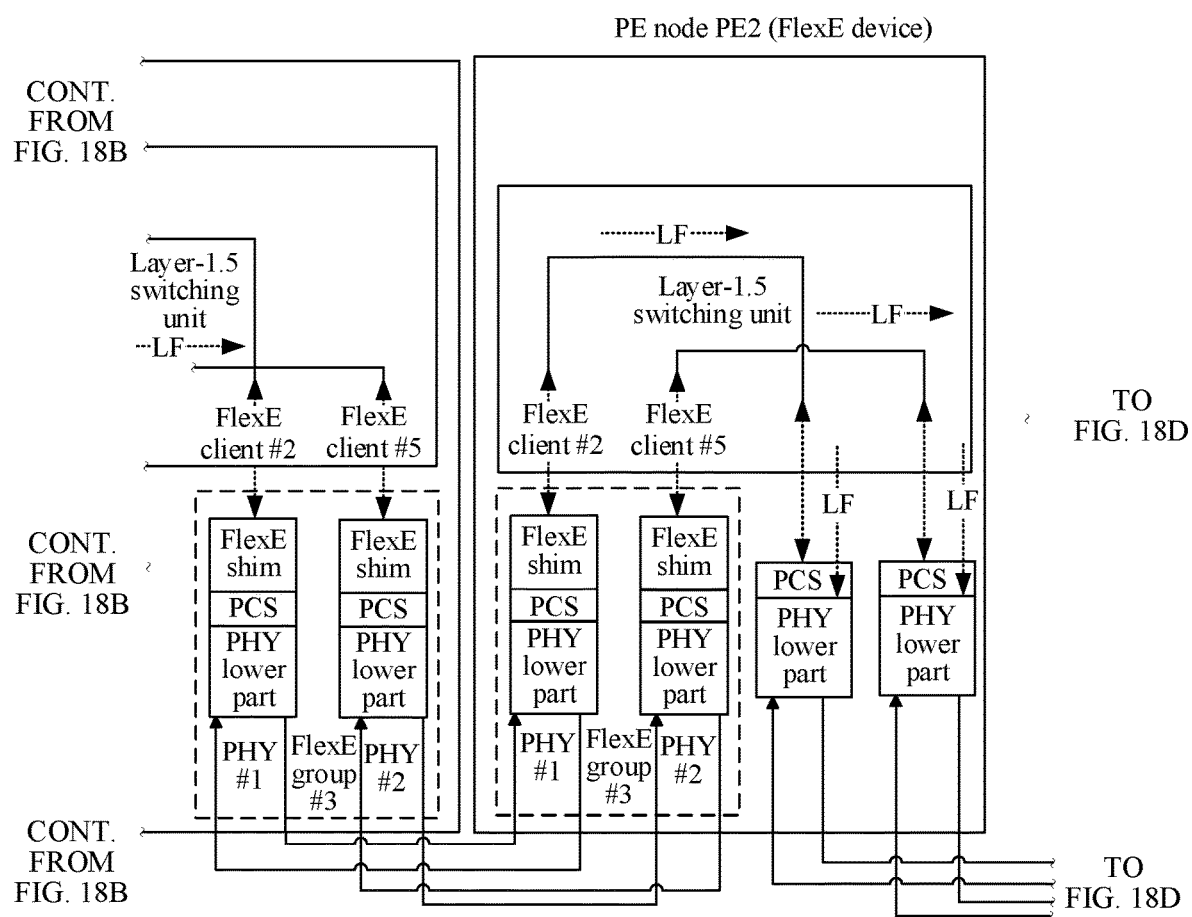
Figure 18D:
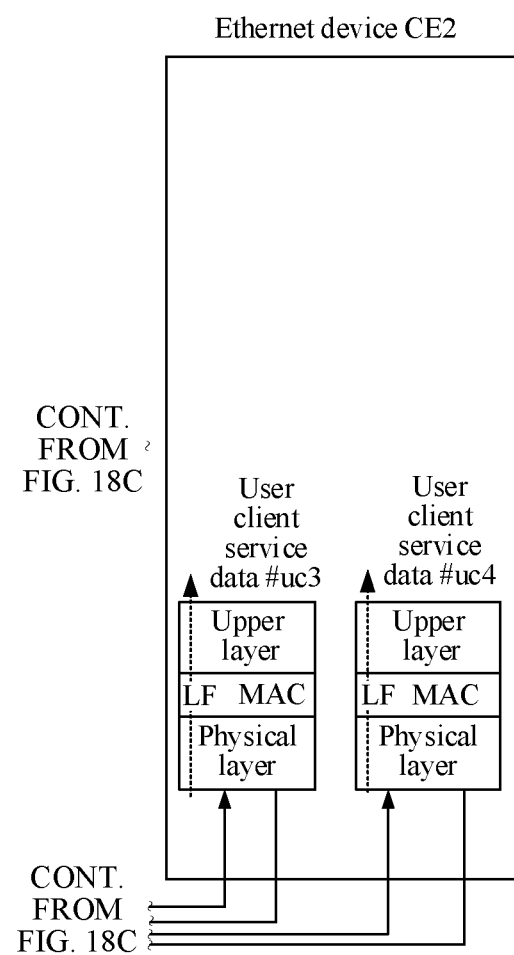

FIG. 14 is a schematic diagram of another example of an SLAI code block according to an embodiment of the present subject matter. As shown in FIG. 14, the SLAI code block uses a control code block, where a control type of the control code block is 0x4B, an O code is a value that has not been standardized in a current IEEE 802.3 standard specification, for example, 10.

FIG. 15 is a schematic diagram of still another example of an SLAI code block according to an embodiment of the present subject matter. As shown in FIG. 15, the SLAI code block uses a control code block, where a control type of the control code block is 0x00, and each of D1 to D7 takes any value.

When a PHY fault occurs, S111 may be performed to detect whether a fault in at least one PHY included in a FlexE group disappears. If the PHY fault in the does not disappear, perform S112 continues to be performed.

When the fault in the at least one PHY disappears, a fault indication code block is stopped from being sent to a FlexE client corresponding to the at least one PHY in which the fault occurs.

Herein, when the fault in the PHY disappears, the SLAI code block is stopped from being periodically sent to the corresponding FlexE client, to notify a downstream device that the fault in the PHY disappears.

FIG. 16 is a flowchart of another method for indicating a fault in FlexE according to an embodiment of the present subject matter. The method specifically includes the following steps.

S161. Detect whether a FlexE client signal includes a fault indication code block.

In the FlexE network, a PE node located downstream detects a fault indication code block on a UNI side interface of the PE node. In a specific example, in the FlexE network, a dSLAI of the PE node located downstream detects an SLAI code block on the UNI side interface of the PE node.

S162. When a predetermined fault indication code block is detected, continuously send a fault signal to a UNI corresponding to the FlexE client signal.

Herein, the fault signal is a signal used to notify a UNI side user outside the FlexE network that a fault occurs in the FlexE. When the UNI is a standard Ethernet interface, an LF signal is sent to the UNI according to an IEEE 802.3 standard specification. When the UNI is an SDH interface, an MS-AIS (multiplex section alarm indication signal) signal is sent to the UNI according to an ITU-T G.707 specification. When the UNI is an OTN interface, an ODU-AIS (optical data unit-alarm indication signal) signal is sent to the UNI according to an ITU-T G.709 specification. When the UNI is a CPRI, and a CPRI synchronization control word is sent to a UNI side according to a CPRI standard, the CPRI synchronization control word is replaced with an invalid character, for example, K28.5 is replaced with 0 (where interfaces are CPRIs 1 to 7), or /S/ is replaced with 0 (where interfaces are CPRIs 7A, and 8 to 10), to trigger a downstream CPRI client to generate an LOF (loss of frame) alarm. Alternatively, the downstream CPRI client is triggered to generate another alarm in another manner. There are also similar alarms for other user network interfaces, which are not listed herein one by one. The following uses a standard Ethernet interface as an example for description.

If detecting a predetermined fault indication code block, the dSLAI terminates the fault indication code block, and continuously sends an LF signal to a corresponding UNI. The fault indication code block is the same as that described above, and details are not described herein again. A format of the LF signal is shown in FIG. 17.

That a predetermined fault indication code block is detected means: one fault indication code block is detected, fault indication code blocks whose quantity is greater than a preset threshold are detected in a predetermined quantity of received code blocks, or fault indication code blocks whose quantity is greater than a preset threshold are detected within a predetermined time. In an example, if one SLAI code block is detected in a process of receiving the FlexE client signal, it is determined that the predetermined SLAI code block is detected. Alternatively, if 30000 code blocks are consecutively received, five SLAI code blocks are detected, and a preset threshold is equal to 3, it is determined that the predetermined SLAI code block is detected. In another example, within a predetermined time, if five SLAI code blocks are detected, and a preset threshold is equal to 3, it is determined that the predetermined SLAI code block is detected.

After the predetermined fault indication code block is detected, the dSLAI of the PE node in the FlexE network continuously detects the SLAI code block on the UNI side interface of the PE node. If no SLAI code block is detected anymore, the dSLAI stops sending the LF signal to the UNI. Furthermore, the exchange functions of a FlexE client and a UNI side user client may be quickly enabled, to restore data information exchange.

That no SLAI code block is detected any more means: no SLAI code block or SLAI code blocks whose quantity is less than a preset threshold are detected in a predetermined quantity of received code blocks, or no SLAI code block or SLAI code blocks whose quantity is less than a preset threshold are detected within a predetermined time. In an example, after the predetermined SLAI is detected, if 30000 code blocks are consecutively received, and no SLAI code block is detected, it is determined that no SLAI code block is detected anymore; or if two SLAI code blocks are detected and a preset threshold is equal to 3, it is determined that no SLAI code block is detected anymore. In another example, after the predetermined SLAI is detected, if no SLAI code block is detected within, for example, 10 SLAI sending periods, it is determined that no SLAI code block is detected anymore; or if two SLAI code blocks are detected within, for example, 10 SLAI sending periods, and a preset threshold is equal to 3, it is determined that no SLAI code block is detected anymore.

According to the method, the SLAI code block can be detected, and a capability, of the FlexE, of notifying a node outside the network that a PHY fault occurs in the network is retained.

The following describes the technical solutions of the present subject matter in detail with reference to specific embodiments. FIG. 18A to FIG. 18D are schematic diagrams of an example showing that a PHY fault occurs according to an embodiment of the present subject matter.

As shown in FIG. 18A to FIG. 18D, a PE node PE1, a P node P1, a P node P2, and a PE node PE2 form a FlexE network. Two ends of the FlexE network are connected to an Ethernet device CE1 and an Ethernet device CE2.

The Ethernet device CE1 transmits data with the Ethernet device CE2 by using the PE node PE1, the P node P1, the P node P2, and the PE node PE2.

The Ethernet device CE1 transmits user client service data #uc1 and user client service data #uc2. The user client service data #uc1 and the user client service data #uc2 are sequentially transmitted to the PE node PE1 respectively through an upper layer, a medium access control (MAC) layer, and a physical layer.

In the PE node PE1, two paths of data are transmitted to the P node P1 separately through a physical layer lower part (PHY lower part) and a physical coding sublayer (PCS), through a layer-1.5 switching unit, and through a FlexE shim, a PCS, and a PHY lower part in a FlexE group #1. The layer-1.5 switching unit is layer 1.5, where the layer 1.5 is a data transmission layer related to a FlexE protocol, and is located between a physical layer and a MAC layer in an open system interconnection (OSI) seven-layer model.

In the P node P1, the two paths of data are transmitted to the P node P2 separately through a PHY lower part, a PCS, and a FlexE shim in a FlexE group #1, through a layer-1.5 switching unit, and through a FlexE shim, a PCS, and a PHY lower part in a FlexE group #2.

In the P node P2, the two paths of data are transmitted to the PE node PE2 separately through a PHY lower part, a PCS, and a FlexE shim in a FlexE group #2, through a layer-1.5 switching unit, and through a FlexE shim, a PCS, and a PHY lower part in a FlexE group #3.

In the PE node PE2, the two paths of data are transmitted to the Ethernet device CE2 separately through a PHY lower part, a PCS, and a FlexE shim in a FlexE group #3, through the layer-1.5 switching unit, and through a PCS and a PHY lower part.

In the Ethernet device CE2, two paths of data are transmitted separately and sequentially through a PHY, a MAC, and an upper layer, to obtain user client service data #uc3 and user client service data #uc4. Transmission of the user client service data #uc1 corresponds to the transmission of the user client service data #uc3. Transmission of the user client service data #uc2 corresponds to the transmission of user client service data #uc4.

When a fault occurs in a receive-side physical layer link of a PHY #1 port in the FlexE group #2 of the P node P2, a PHY #1 generates an LOS signal. That is, a fault occurs in the PHY #1, leading to a fault in all links of an entire FlexE group #2.

Based on the OIF FlexE 1.0 specification, the P2 continuously sends an LF signal in a downstream direction of two FlexE clients, namely, a FlexE client #1 and a FlexE client #3, carried on the FlexE group #2, and an LF signal flow is transmitted through downstream paths of a FlexE client #1 channel and a FlexE client #3 channel to the PE node PE2 and a FlexE client #2 and a FlexE client #5 carried on the FlexE group #3 of the P2 device.

FIG. 18A to FIG. 18D show that a fault occurs in a PHY between the FlexE group #2 of the P node P1 and the FlexE group #2 of the P node P2. The following describes the technical solutions of the embodiments of the present subject matter by using an example in which the foregoing PHY fault occurs.

In FIG. 19A to FIG. 22D, a P node performs data exchange from an eastbound FlexE client to a westbound FlexE client, and a PE node performs data exchange between a FlexE client on an NNI side and a UNI side user client. An sSLAI of the P node is used to detect whether a PHY fault occurs. A dSLAI of the PE node is used to detect an SLAI code block, and the dSLAI may be deployed at a FlexE client on an NNI side of the PE node, or may be deployed on a UNI side of the PE node.

Figure 19A:
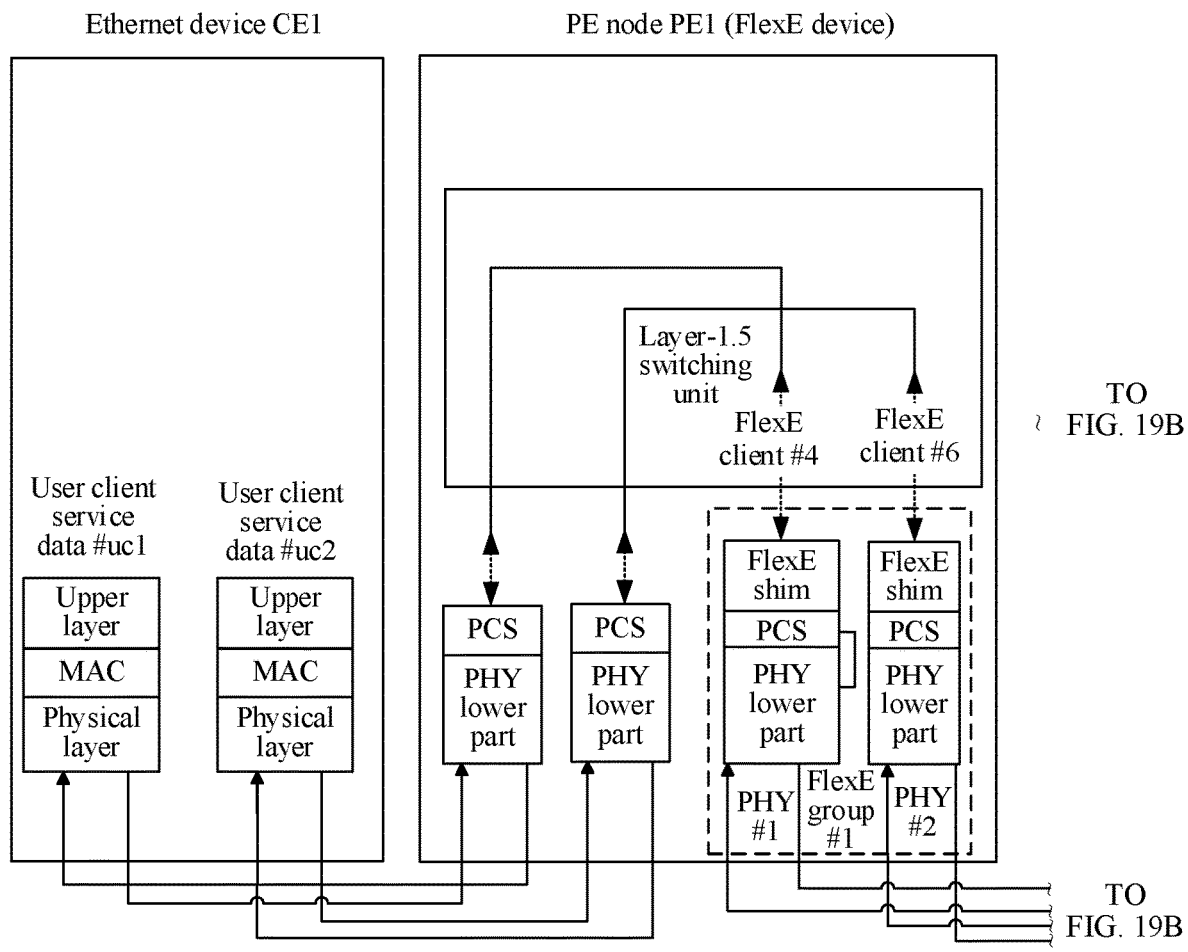
FIG. 19A to FIG. 19D are schematic diagrams of detecting a PHY fault according to an embodiment of the present subject matter.
Figure 19B:
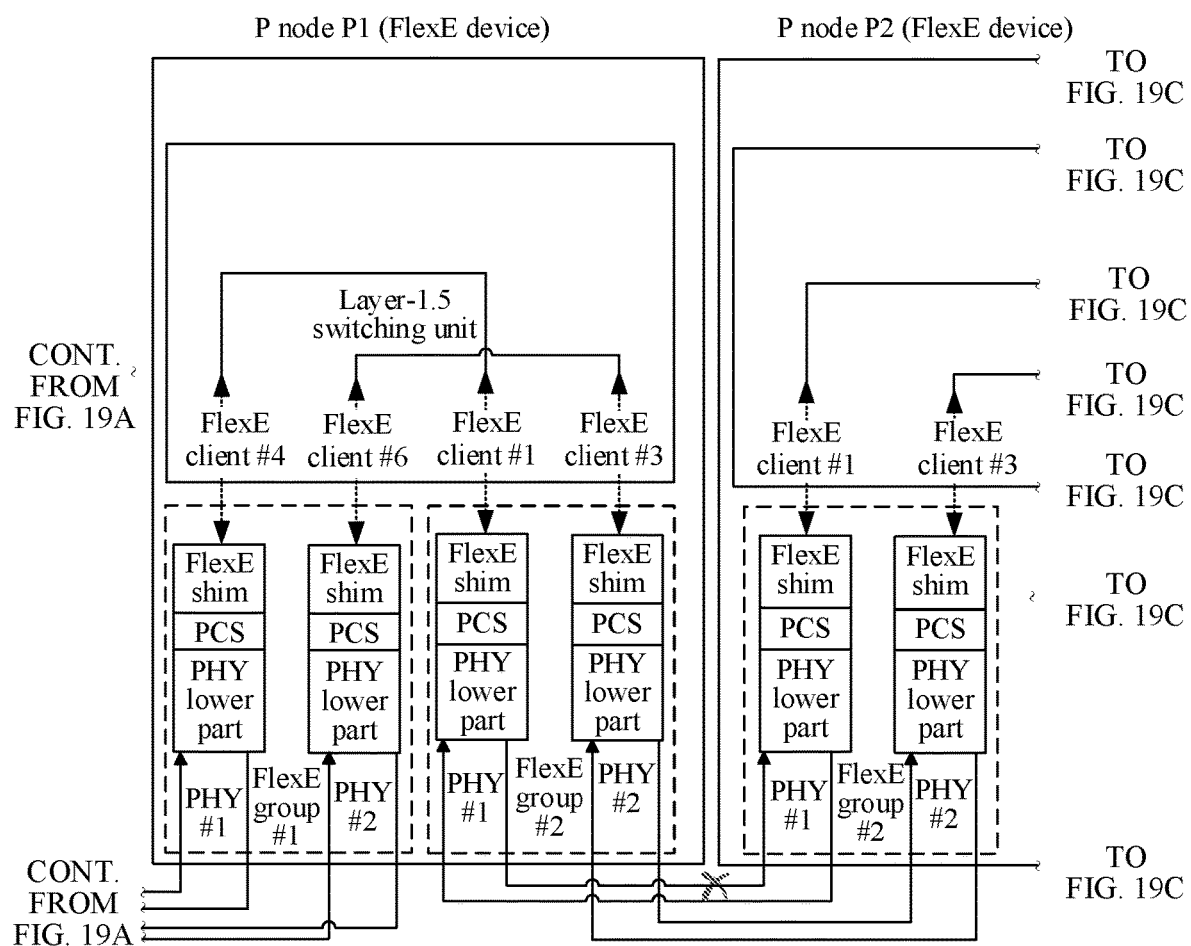
Figure 19C:
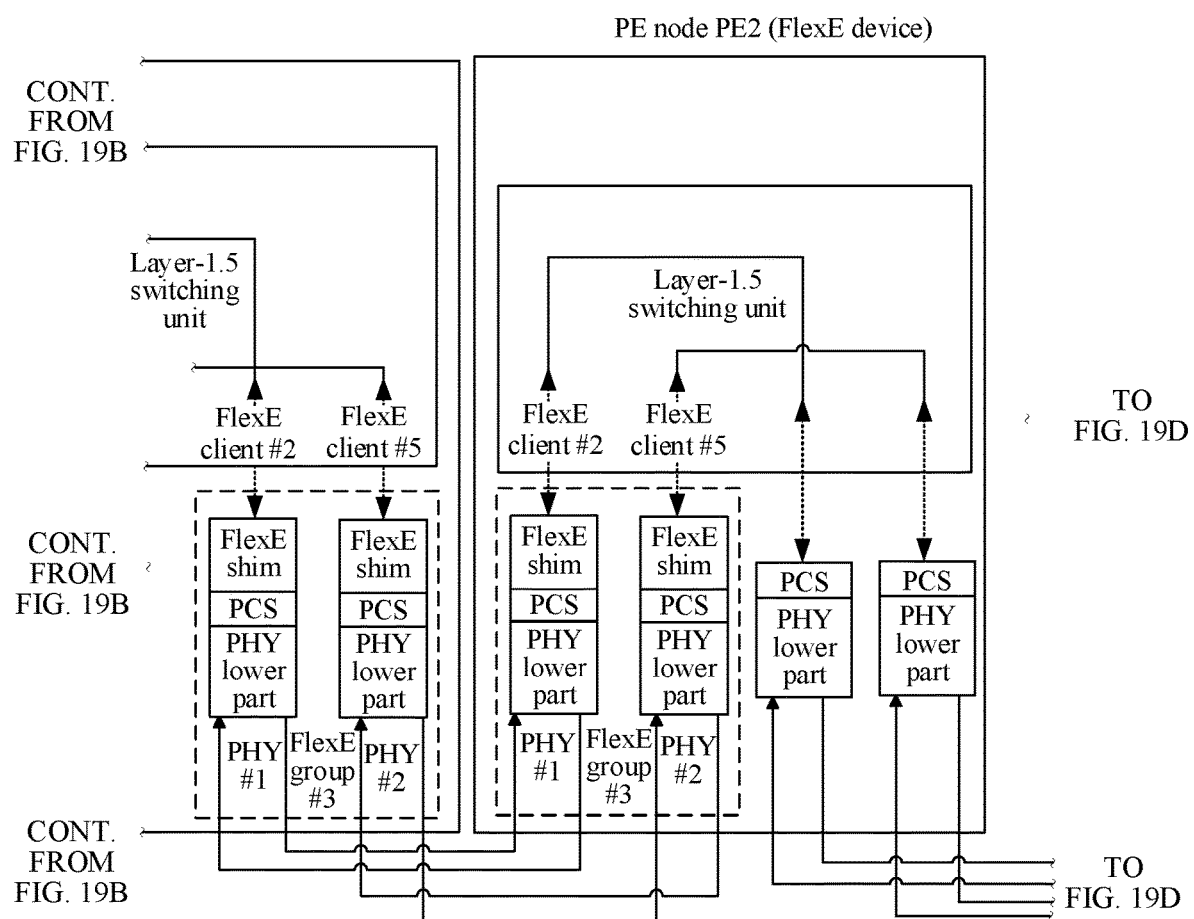
Figure 19D:
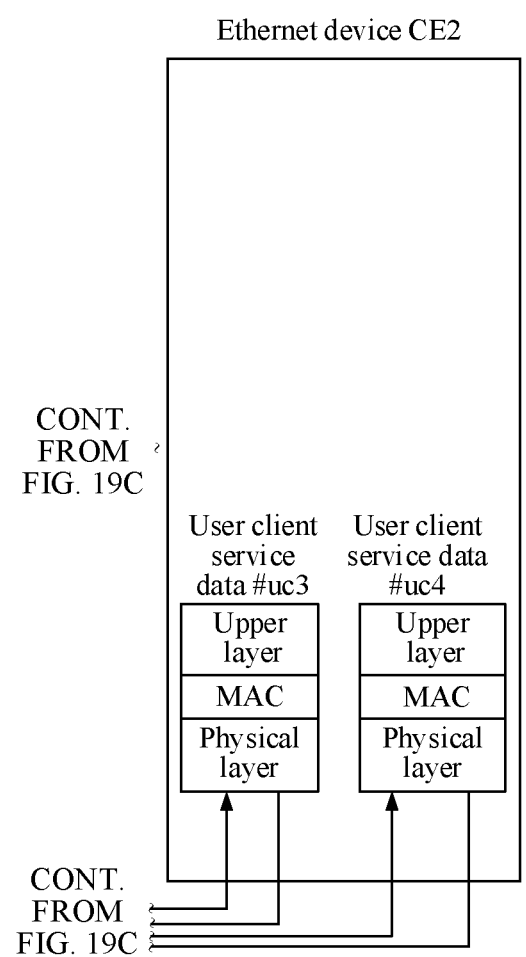

FIG. 19A to FIG. 19D are schematic diagrams of detecting a PHY fault according to an embodiment of the present subject matter. In FIG. 19B, when a PHY fault occurs on a link between the FlexE group #2 of the P node P1 and the FlexE group #2 of the P node P2, an LF signal is not continuously sent immediately to a downstream direction of the two FlexE clients (the FlexE client #1 and the FlexE client #3) carried on the FlexE group #2.

Figure 20A:
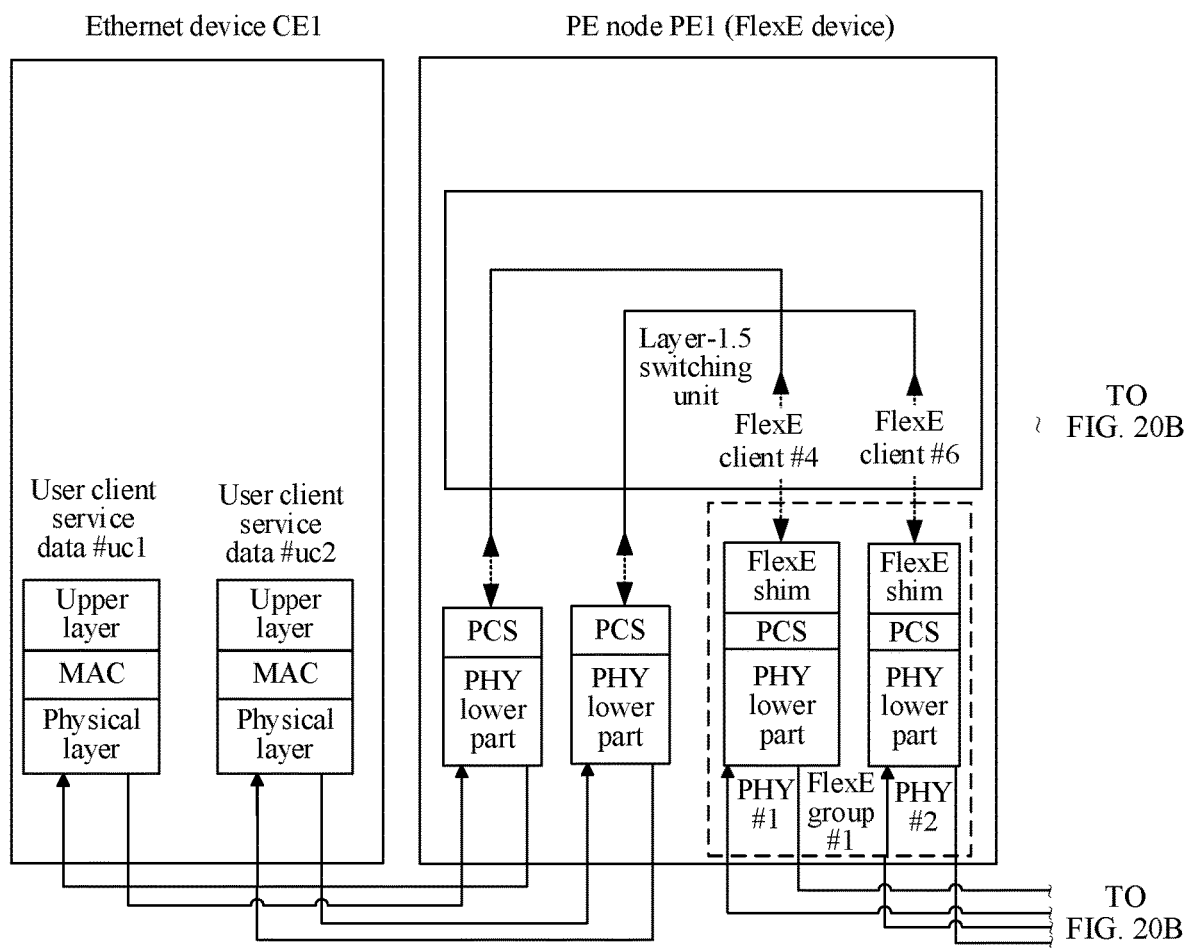
FIG. 20A to FIG. 20D are schematic diagrams of sending an SLAI code block according to an embodiment of the present subject matter.
Figure 20B:
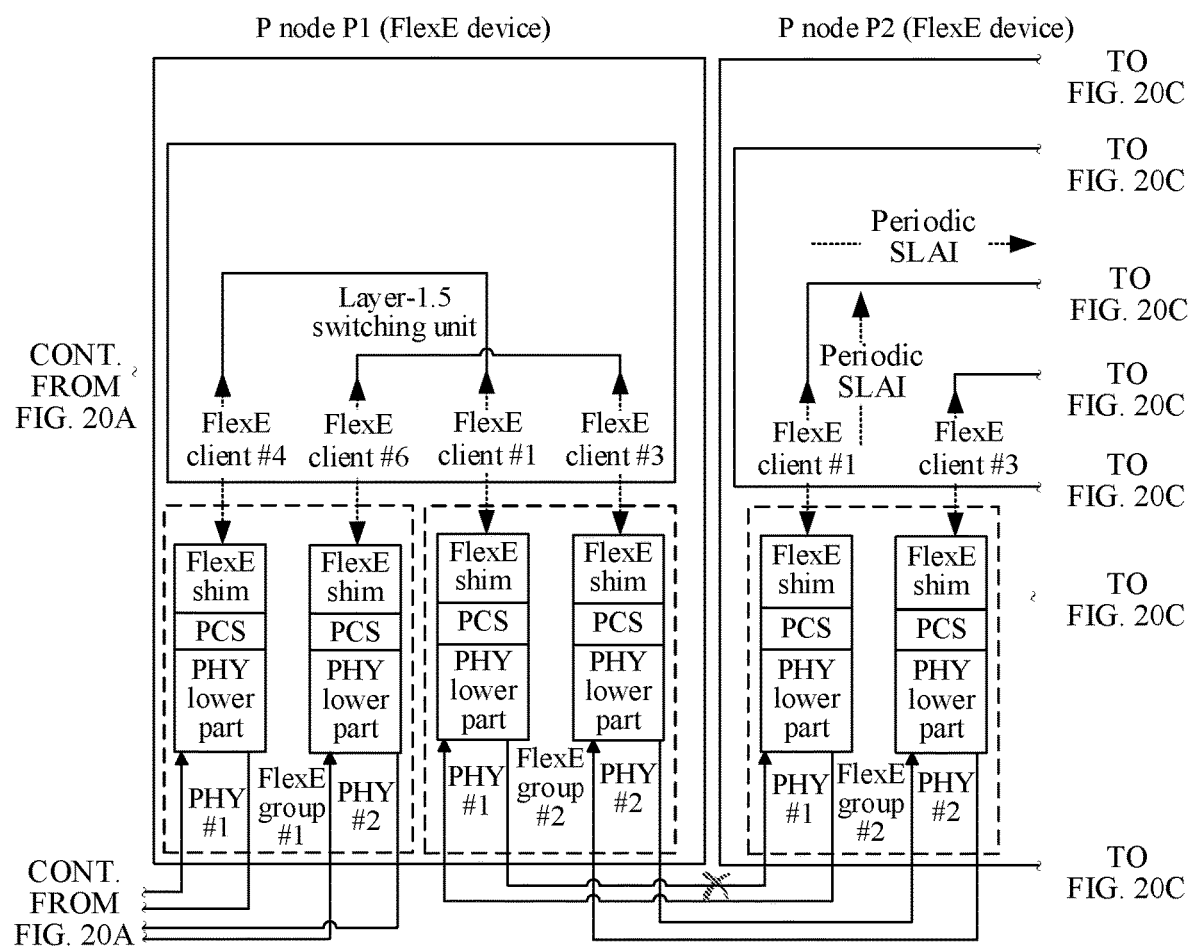
Figure 20C:
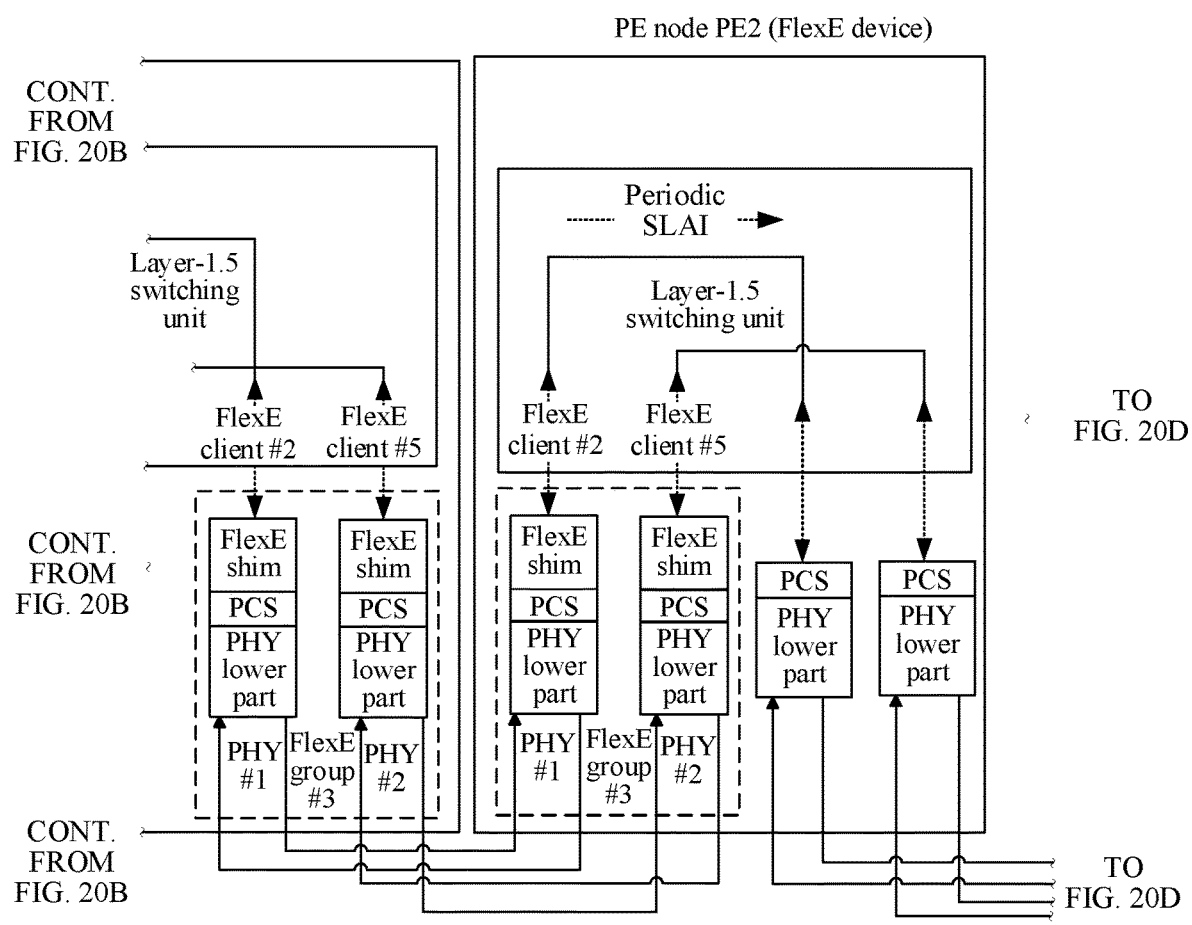
Figure 20D:
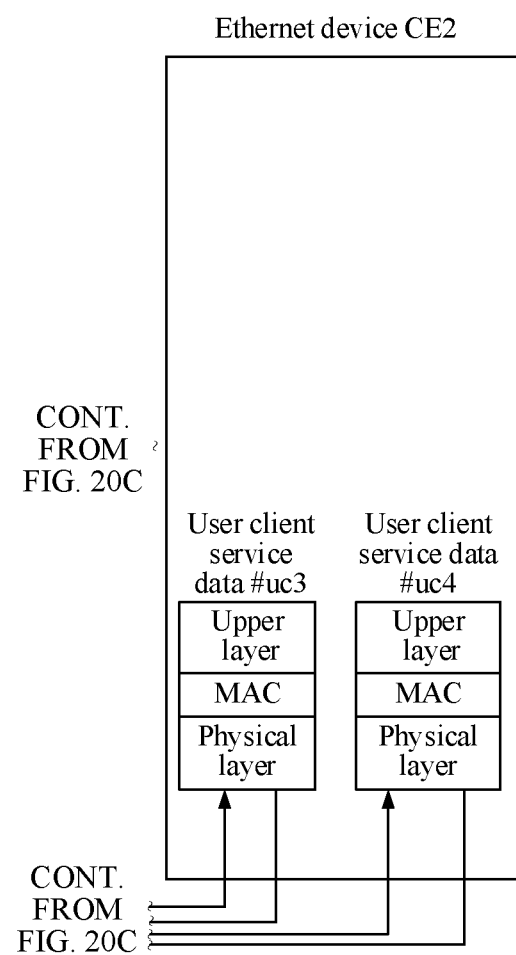
Figure 21A:
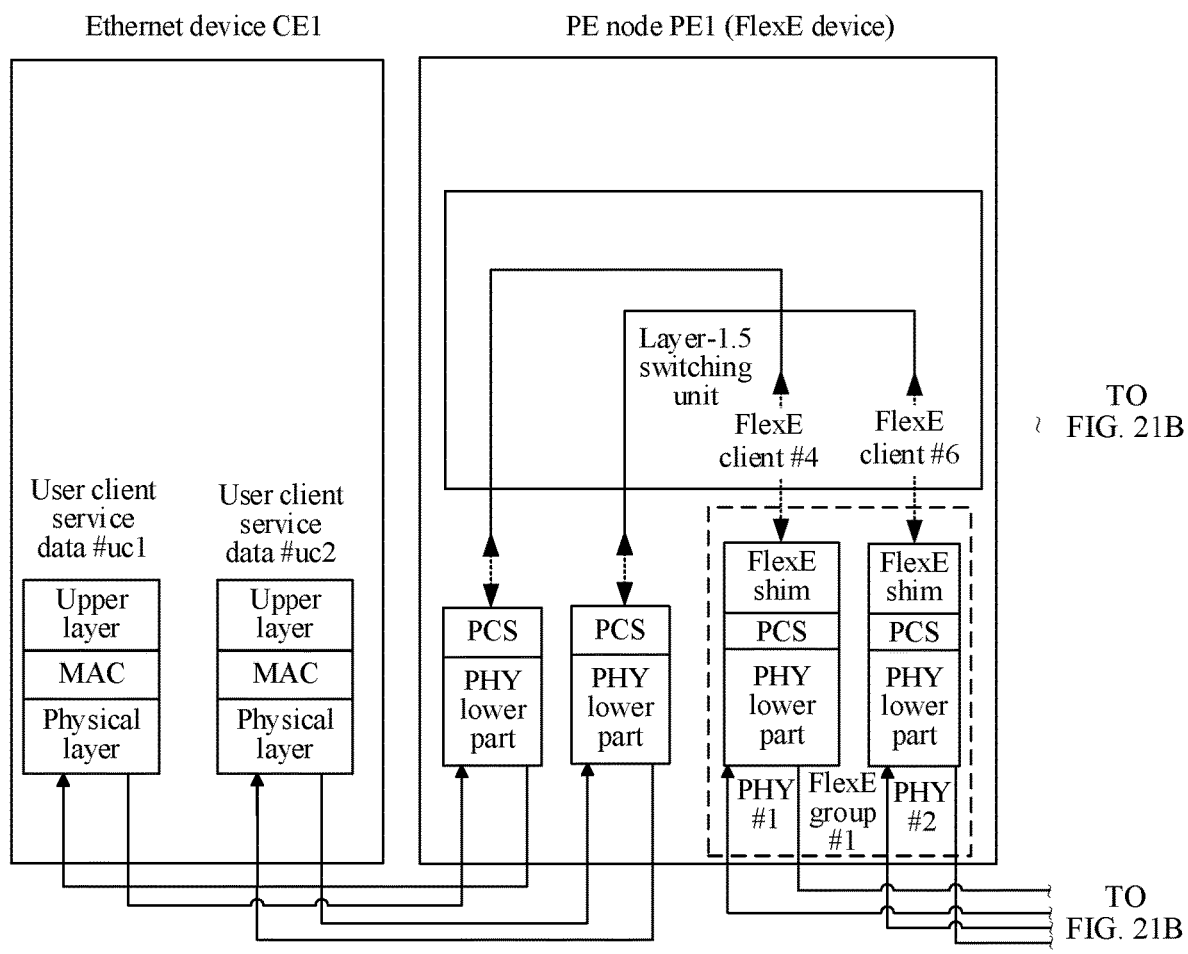
FIG. 21A to FIG. 21D are schematic diagrams of sending an LF signal according to an embodiment of the present subject matter.
Figure 21B:
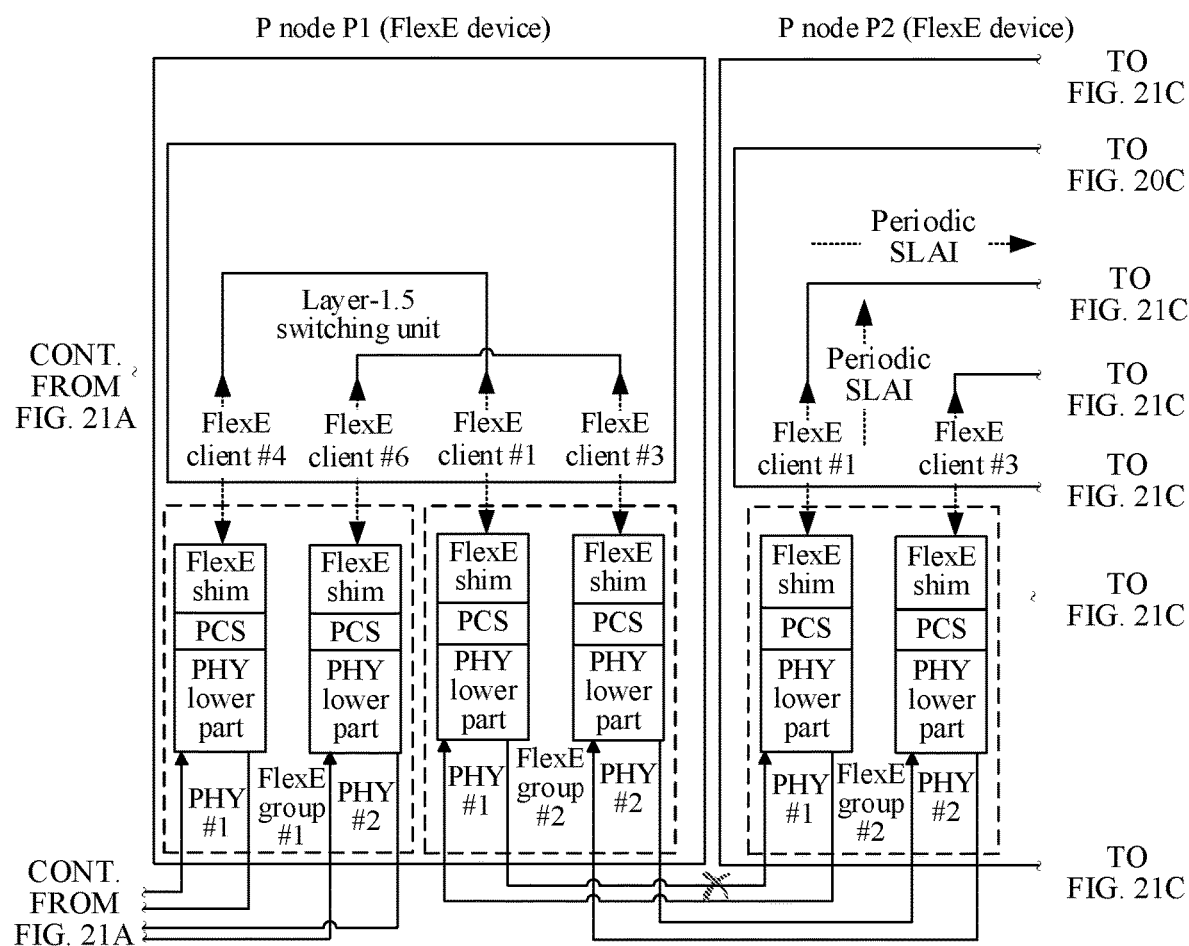
Figure 21C:
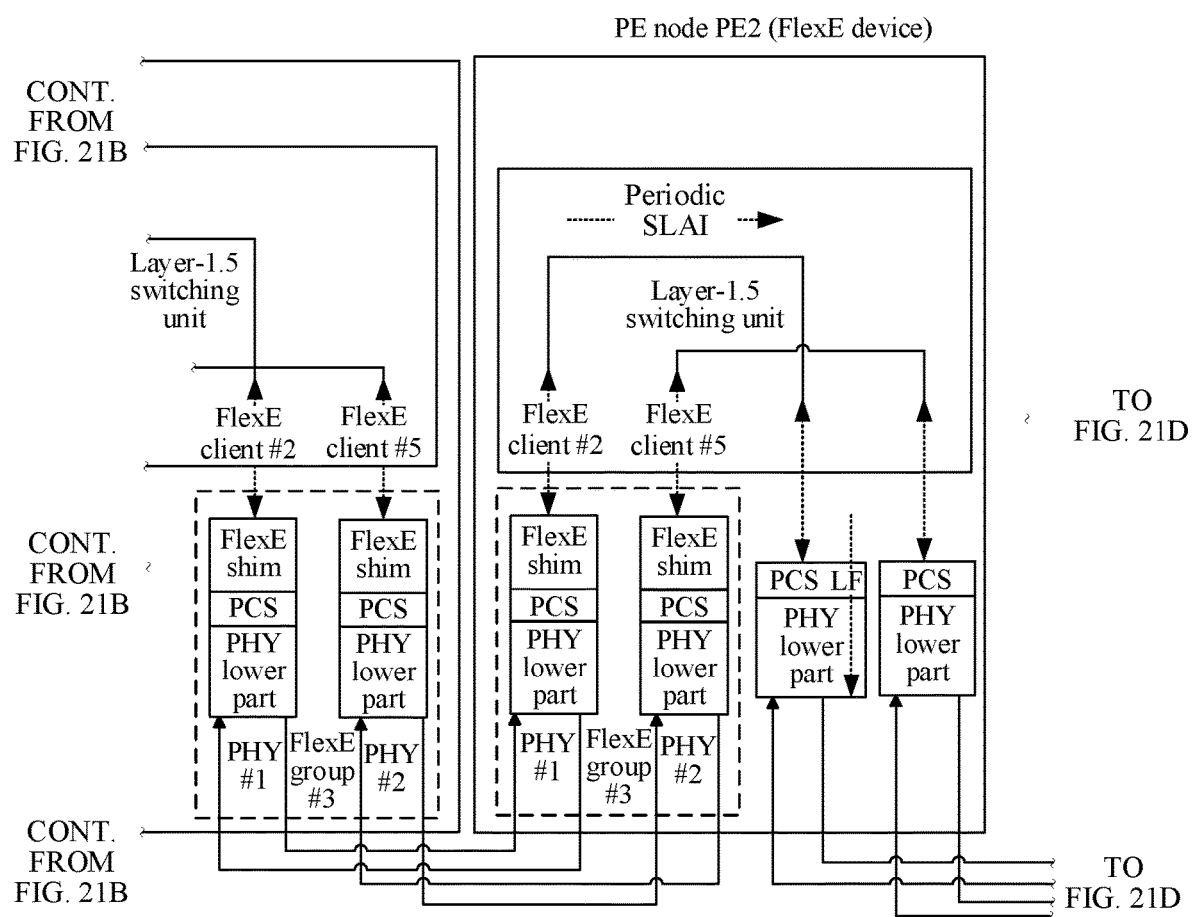
Figure 21D:
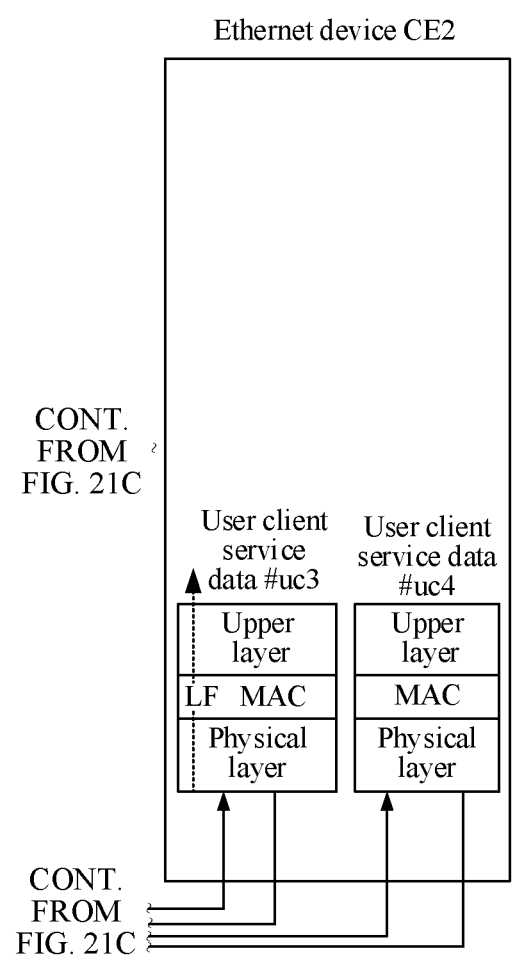
Figure 22A:
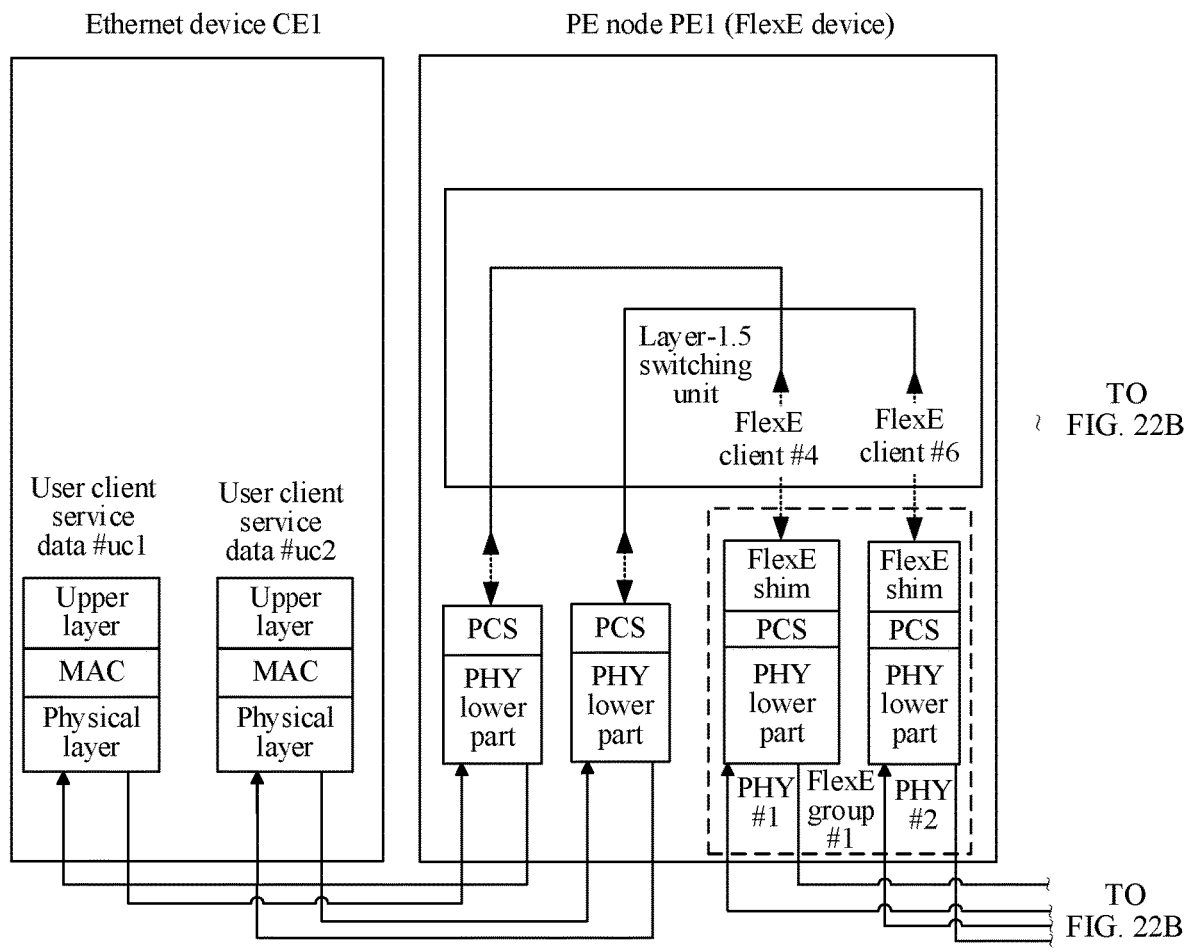
FIG. 22A to FIG. 22D are schematic diagrams showing that a PHY fault disappears according to an embodiment of the present subject matter.
Figure 22B:
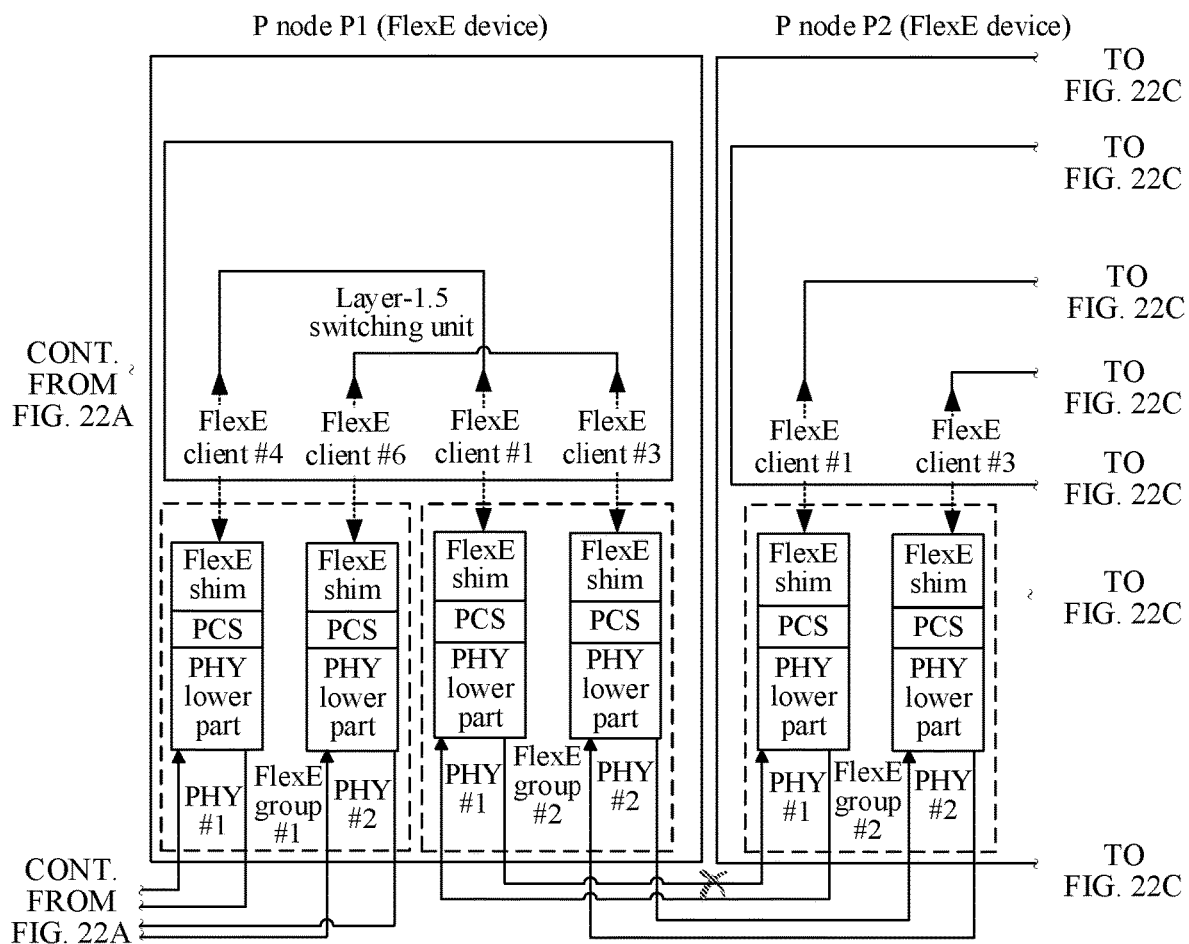
Figure 22C:
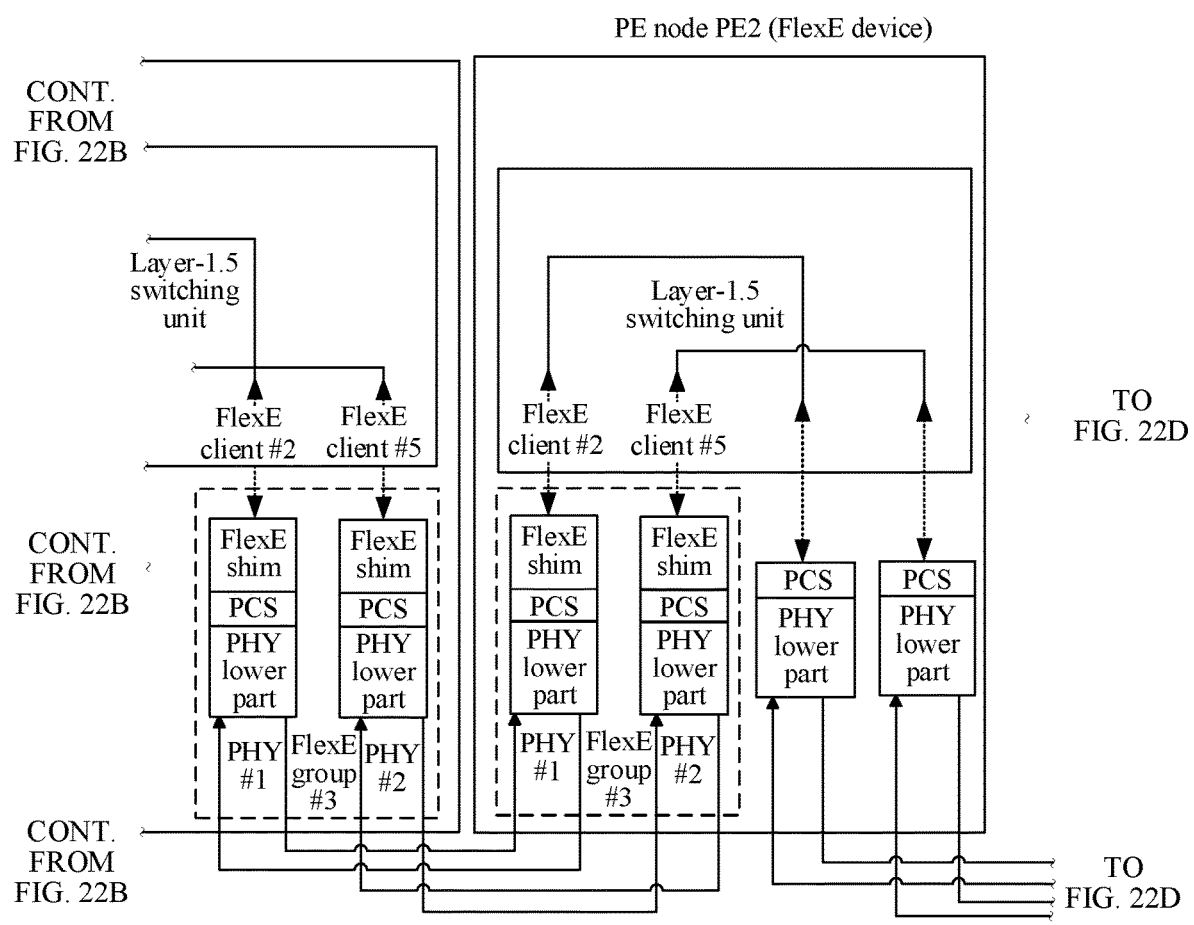
Figure 22D:
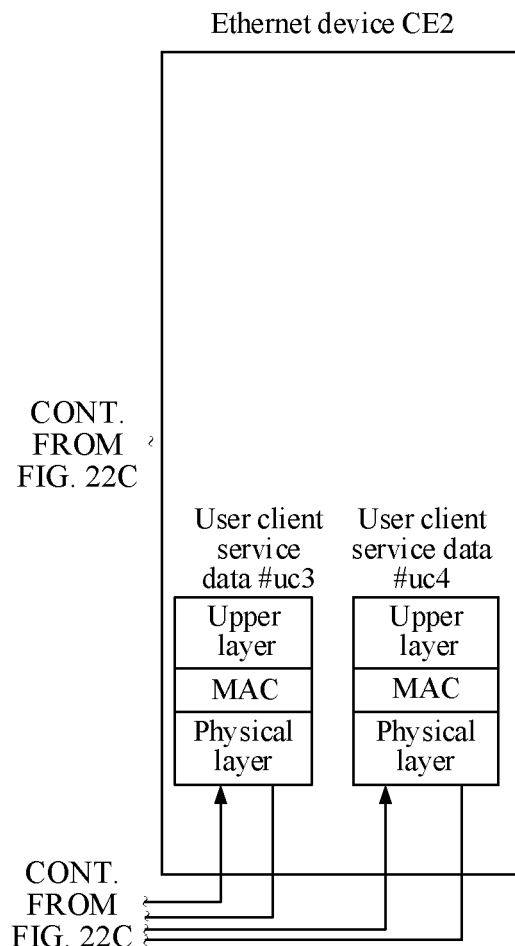

An sSLAI of the P node P2 periodically sends an SLAI code block to the FlexE client #1 carried on the FlexE group. FIG. 20A to FIG. 20D are schematic diagrams of sending an SLAI code block according to an embodiment of the present subject matter. In FIG. 20B, the sSLAI of the P node P2 periodically sends an SLAI code block. Optionally, an idle code block is sent between such SLAI code blocks in two adjacent periods.

In an example, the sSLAI may send two SLAI code blocks in one period, that is, two consecutive SLAI code blocks are sent at an interval of a predetermined time. An idle code block is sent between such SLAI code blocks in two adjacent periods. A format of the idle code block is shown in FIG. 12, and the SLAI code block may be anyone shown in FIG. 13 to FIG. 15.

A dSLAI of the PE node PE2 detects a SLAI code block, terminates a predetermined SLAI code block when the SLAI code block is detected, and continuously sends an LF signal to the UNI. FIG. 21A to FIG. 21D are schematic diagrams of sending an LF signal according to an embodiment of the present subject matter. A format of the LF signal is shown in FIG. 17.

When detecting the predetermined SLAI code block, the dSLAI terminates the SLAI code block, and continuously sends the LF signal to the corresponding UNI, that is, interrupts the exchange functions of the FlexE client and UNI side user client, that is, interrupts originally exchanged information.

It can be learned that, in this embodiment of the present subject matter, an LF signal is not continuously sent to a downstream direction of each FlexE client carried on a FlexE group immediately after a PHY fault is detected in the FlexE group. Instead, an SLAI code block is periodically sent to a FlexE client #2 corresponding to a PHY #1 in which the fault occurs. The dSLAI of the PE node PE2 continuously sends an LF signal to the UNI only after detecting the predetermined SLAI code block. That is, there is a condition for interrupting original exchanged information, and the condition is that the PE node PE2 located downstream detects the predetermined SLAI code block.

When the sSLAI of the P node P2 detects that the PHY fault in the FlexE group #2 disappears, the sSLAI of the P node P2 stops sending the SLAI code block to the FlexE client #2 carried on the FlexE group. FIG. 22A to FIG. 22D are schematic diagrams showing that a PHY fault disappears according to an embodiment of the present subject matter.

The PE node PE2 does not detect the SLAI code block, that is, the SLAI code block has disappeared, and stops continuously sending the LF signal to the related UNI. Refer to FIG. 22A to FIG. 22D.

The dSLAI of the PE node PE2 stops sending the LF signal to the UNI, that is, restores the exchange functions of the FlexE client on the NNI side and the UNI side user client, and no longer interferes with exchanged content.

The foregoing describes the method for indicating a fault in the embodiments of the present subject matter, and the following describes an apparatus for indicating a fault corresponding to the foregoing method.

Figure 23:
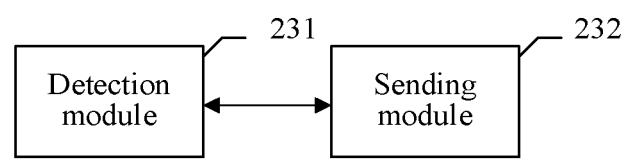
FIG. 23 is a schematic structural diagram of an apparatus for indicating a fault according to an embodiment of the present subject matter.

FIG. 23 is a schematic structural diagram of an apparatus for indicating a fault according to an embodiment of the present subject matter. The apparatus corresponds to a method for indicating a fault.

The apparatus specifically includes a detection module 231 and a sending module 232. It should be noted that an sSLAI/a dSLAI includes the apparatus in FIG. 23, that is, includes the detection module 231 and the sending module 232.

The detection module 231 is configured to detect whether a fault occurs in at least one PHY included in a FlexE group.

The sending module 232 is configured to: when a fault occurs in the at least one PHY, periodically send a fault indication code block to a FlexE client corresponding to the at least one PHY in which the fault occurs.

In a possible implementation, that the sending module 232 is specifically configured to: when a PHY fault occurs, periodically send a fault indication code block to a FlexE client corresponding to the at least one PHY in which the fault occurs includes: sending an idle code block between two adjacent fault indication code blocks.

In a possible implementation, the sending module 232 is specifically configured to: when a PHY fault occurs, periodically send a fault indication code block to a FlexE client corresponding to the at least one PHY in which the fault occurs, that is, when the fault is detected, consecutively send a plurality of fault indication code blocks to the FlexE client corresponding to the at least one PHY in which the fault occurs, periodically send the fault indication code block to the FlexE client corresponding to the at least one PHY in which the fault occurs, and send an idle code block between two adjacent fault indication code blocks.

In a possible implementation, the fault indication code block includes a control type field and a fault identification field which is used to indicate that a fault occurs in a PHY In a possible implementation, the fault indication code block further includes a fault type identification field, the fault type identification field is used to indicate a fault type of the fault occurred in the at least one PHY, and the fault type includes: the PHY loses a signal, the PHY cannot lock a code block, the PHY cannot lock an alignment code block, and a high-bit error rate alarm is detected in the PHY In a possible implementation, the fault indication code block is an SLAI code block, and the SLAI code block is defined based on any field reserved in an IEEE 802.3 standard specification for a standard Ethernet.

In a possible implementation, the detection module 231 is further configured to detect, when the fault occurs in the PHY, whether the fault in the at least one PHY included in the FlexE group disappears.

The sending module 232 is further configured to: when the fault in the at least one PHY disappears, stop sending the fault indication code block to the FlexE client corresponding to the at least one PHY in which the fault occurs.

Figure 24:
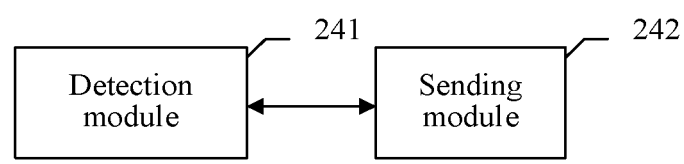
FIG. 24 is a schematic structural diagram of another apparatus for indicating a fault according to an embodiment of the present subject matter.

FIG. 24 is a schematic structural diagram of an apparatus for indicating a fault according to an embodiment of the present subject matter. The apparatus corresponds to a method for indicating a fault.

The apparatus specifically includes a detection module 241 and a sending module 242. It should be noted that a dSLAI includes the apparatus in FIG. 24, that is, includes the detection module 241 and the sending module 242.

For example, in FlexE, a PE node receives a signal from a P node.

The detection module 241 is configured to detect whether a FlexE client signal includes a fault indication code block.

The sending module 242 is configured to: when a predetermined fault indication code block is detected, continuously send a fault signal to a UNI corresponding to the FlexE client signal.

Herein, the fault signal is a signal used to notify a UNI side user outside the FlexE network that a fault occurs in the FlexE network. When the UNI is a standard Ethernet interface, an LF (local fault) signal is sent to the UNI according to an IEEE 802.3 standard specification. When the UNI is an SDH interface, an MS-AIS (multiplex section alarm indication signal) signal is sent to the UNI according to an ITU-T G.707 specification. When the UNI is an OTN interface, an ODU-AIS signal is sent to the UNI according to an ITU-T G.709 specification. When the UNI is a CPRI interface, and a CPRI synchronization control word is sent to the UNI side according to a CPRI standard, the CPRI synchronization control word is replaced with an invalid character, for example, K28.5 is replaced with 0 (where interfaces are CPRIs 1 to 7), or /S/ is replaced with 0 (where interfaces are CPRIs 7A and 8 to 10), to trigger a downstream CPRI client to generate an LOF (loss of frame) alarm. Alternatively, the downstream CPRI client is. There are also similar alarms for other user network interfaces, which are not listed herein one by one.

In a possible implementation, the detection module 241 is further configured to: after the predetermined fault indication code block is detected, continuously detect the fault indication code block. The sending module 242 is further configured to: when no fault indication code block is detected by the detection module, stop sending the fault signal to the UNI.

According to the foregoing manner of the present subject matter, if detecting the predetermined fault indication code block, the dSLAI terminates the fault indication code block, and continuously sends an LF signal to the corresponding UNI. The fault indication code block is the same as that described above, and details are not described herein again.

In a possible implementation, that a predetermined fault indication code block is detected means that one fault indication code block is detected, fault indication code blocks whose quantity is greater than a preset threshold are detected in a predetermined quantity of received code blocks, or fault indication code blocks whose quantity is greater than a preset threshold are detected within a predetermined time. That no fault indication code block is detected means that no fault indication code block or fault indication code blocks whose quantity is less than the preset threshold are detected in the predetermined quantity of received code blocks, or no fault indication code block or fault indication code blocks whose quantity is less than the preset threshold are detected within the predetermined time.

In a possible implementation, the fault signal is any one of an LF signal, an MS-AIS signal, an ODU-AIS signal, a CPRI invalid synchronization control word signal, or another signal.

In the method, the fault indication code block may be detected, and a capability, of the FlexE, of notifying a node outside the network that a PHY fault occurs in the network is retained.

Figure 25:
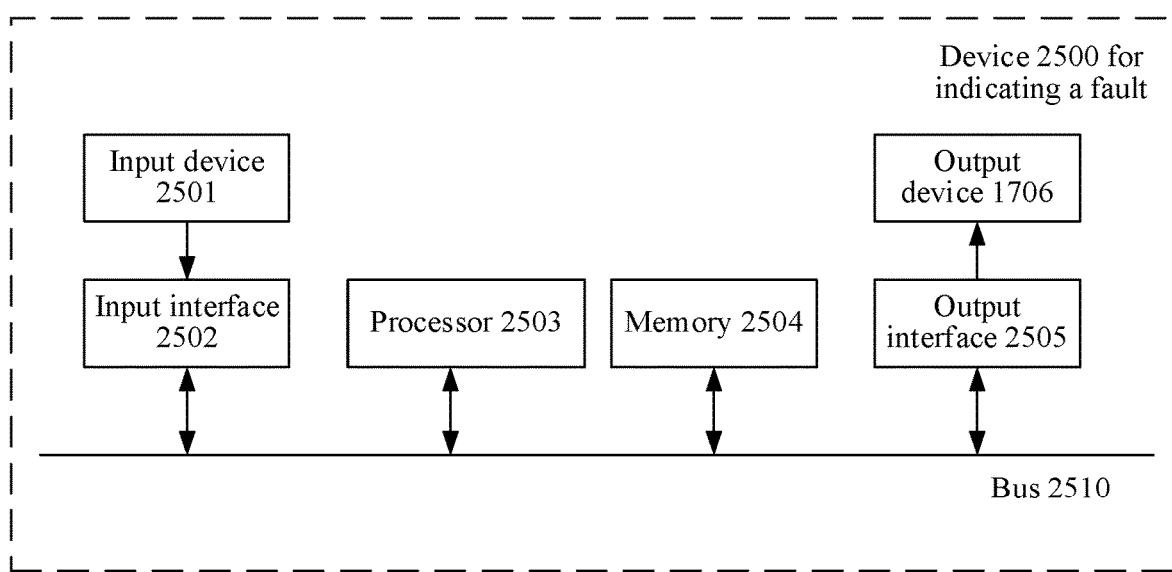
FIG. 25 is a schematic block diagram of a fault indication device according to an embodiment of the present subject matter.

FIG. 25 is a schematic block diagram of a fault indication device according to an embodiment of the present subject matter. As shown in FIG. 25, the fault indication device 2500 includes an input device 2501, an input interface 2502, a processor 2503, a memory 2504, an output interface 2505, and an output device 2506.

The input interface 2502, the processor 2503, the memory 2504, and the output interface 2505 are connected to each other by using a bus 2510. The input device 2501 and the output device 2506 are connected to the bus 2510 respectively by using the input interface 2502 and the output interface 2505, and are further connected to another component of the fault indication device 2500.

Specifically, the input device 2501 receives external input information, and transmits the input information to the processor 2503 through the input interface 2502. The processor 2503 processes the input information according to a computer-executable instruction stored in the memory 2504, to generate output information, temporarily or permanently stores the output information in the memory 2504, and transmits the output information to the output device 2506 through the output interface 2505. The output device 2506 outputs the output information to the outside of the fault indication device 2500 for use by a user.

The fault indication device 2500 may perform the steps in the embodiments of the present subject matter.

The processor 2503 may be one or more central processing units (CPU(s)). When the processor 2503 is one CPU, the CPU may be a single-core CPU or a multi-core CPU.

The memory 2504 may be, but not limited to, one or more of a random-access memory (RAM), a read-only memory (ROM), an erasable programmable read-only memory (EPROM), a compact disc read-only memory (CD-ROM), a hard disk, and the like. The memory 2504 is configured to store program code.

It may be understood that, in this embodiment of the present subject matter, the fault indication device 2500 in FIG. 25 may be the apparatus in FIG. 23, and the fault indication device 2500 may implement a function of each module in FIG. 23.

In addition, it may be understood that, in this embodiment of the present subject matter, the fault indication device 2500 in FIG. 25 may be the apparatus in FIG. 24, and the fault indication device 2500 may implement a function of each module in FIG. 24.

In addition, an embodiment of the present subject matter provides a network device, including the apparatuses in FIG. 23 and FIG. 24. The apparatus shown in FIG. 23 may be disposed on a network-to-network interface chip of the device, and the apparatus shown in FIG. 24 may be disposed on a user-network interface chip of the device.

In addition, an embodiment of the present subject matter further provides a network device, including the apparatus in FIG. 23. The apparatus shown in FIG. 23 may be disposed on a network-to-network interface chip of the device.

All or some of the foregoing embodiments may be implemented by using software, hardware, firmware, or any combination thereof. When all or some of the foregoing embodiments are implemented in a form of a computer program product, the computer program product includes one or more computer instructions. When the computer program instructions are loaded or executed in a computer, the procedures or functions according to the embodiments of the present subject matter are completely or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a digital video disk (DVD)), or a semiconductor medium (for example, a solid-state drive (SSD)), or the like.

Each part of this specification is described in a progressive manner, for same or similar parts in the embodiments, refer to these embodiments, and each embodiment focuses on a difference from other embodiments. Especially, apparatus and system embodiments are basically similar to method embodiments, and therefore are described briefly. For related parts, refer to descriptions on the method embodiments.

What is claimed is:

1. A method comprising:
   detecting whether a fault occurs in at least one physical layer entity included in a flexible Ethernet group; and
   when a fault occurs in the at least one physical layer entity, periodically sending a fault indication code block to a flexible Ethernet client corresponding to the at least one physical layer entity in which the fault occurs,
   wherein the periodically sending the fault indication code block to the flexible Ethernet client corresponding to the at least one physical layer entity in which the fault occurs comprises:
   sending an idle code block between the fault indication code blocks in adjacent periods.

2. A method comprising:
   detecting whether a fault occurs in at least one physical layer entity included in a flexible Ethernet group; and
   when a fault occurs in the at least one physical layer entity, periodically sending a fault indication code block to a flexible Ethernet client corresponding to the at least one physical layer entity in which the fault occurs,
   wherein the periodically sending the fault indication code block to the flexible Ethernet client corresponding to the at least one physical layer entity in which the fault occurs comprises:
   when the fault is detected, consecutively sending at least two of the fault indication code blocks to the flexible Ethernet client corresponding to the at least one physical layer entity in which the fault occurs, periodically sending the fault indication code block to the flexible Ethernet client corresponding to the at least one physical layer entity in which the fault occurs, and sending an idle code block between the fault indication code blocks in adjacent periods.

3. The method according to claim 1, wherein the fault indication code block comprises a control type field and a fault identification field which is used to indicate an occurrence of the fault in the at least one physical layer entity.

4. The method according to claim 3, wherein the fault indication code block further comprises a fault type identification field, the fault type identification field is used to indicate a fault type of the fault occurred in the at least one physical layer entity, and
   wherein the fault type comprises:
   the physical layer entity loses a signal;
   the physical layer entity cannot lock a code block;
   the physical layer entity cannot lock an alignment code block; and
   a high bit error rate alarm is detected in the physical layer entity.

5. The method according to claim 1, wherein the fault indication code block is a service layer alarm indication code block, and the service layer alarm indication code block is defined based on a field reserved in an IEEE 802.3 standard specification for a standard Ethernet.

6. The method according to claim 1,
   wherein the method further comprises:
   detecting whether the fault in the at least one physical layer entity included in the flexible Ethernet group disappears; and
   when the fault in the at least one physical layer entity disappears, stopping sending the fault indication code block to the flexible Ethernet client corresponding to the at least one physical layer entity in which the fault occurs.

7. A method comprising:
   detecting whether a flexible Ethernet client signal comprises a fault indication code block;

when a predetermined fault indication code block is detected, continuously sending a fault signal to a user-network interface corresponding to the flexible Ethernet client signal, after the predetermined fault indication code block is detected, continuously detecting the fault indication code block; and when no fault indication code block is detected, stopping sending the fault signal to the user-network interface, wherein the fault indication code block comprises a control type field and a fault identification field which is used to indicate an occurrence of a fault in at least one physical layer entity.

8. The method according to claim 7, wherein the fault indication code block further comprises a fault type identification field, the fault type identification field is used to indicate a fault type of the fault occurred in the at least one physical layer entity, and
wherein the fault type comprises:
the physical layer entity loses a signal;
the physical layer entity cannot lock a code block;
the physical layer entity cannot lock an alignment code block; and
a high bit error rate alarm is detected in the physical layer entity.

9. The method according to claim 7, wherein the fault indication code block is a service layer alarm indication code block, and the service layer alarm indication code block is defined based on a field reserved in an IEEE 802.3 standard specification for a standard Ethernet.

10. A method comprising:
detecting whether a flexible Ethernet client signal comprises a fault indication code block; and
when a predetermined fault indication code block is detected, continuously sending a fault signal to a user-network interface corresponding to the flexible Ethernet client signal,
wherein that a predetermined fault indication code block is detected indicates that:
one fault indication code block is detected;
fault indication code blocks whose quantity is greater than a preset threshold are detected in a predetermined quantity of received code blocks; or
fault indication code blocks whose quantity is greater than a preset threshold are detected within a predetermined time, and
wherein that no fault indication code block is detected indicates that:
no fault indication code block or fault indication code blocks whose quantity is less than the preset threshold are detected in the predetermined quantity of received code blocks; or
no fault indication code block or fault indication code blocks whose quantity is less than the preset threshold are detected within the predetermined time.

11. A method comprising:
detecting whether a flexible Ethernet client signal comprises a fault indication code block;
when a predetermined fault indication code block is detected, continuously sending a fault signal to a user-network interface corresponding to the flexible Ethernet client signal,
wherein the fault signal is one of a local fault signal, a multiplex section alarm indication signal, an optical data unit alarm indication signal, and a common public radio frequency interface-invalid synchronization control word signal.

12. An apparatus comprising a processor, wherein the processor is configured to:
detect whether a fault occurs in at least one physical layer entity included in a flexible Ethernet group; and
when a fault occurs in the at least one physical layer entity, periodically send a fault indication code block to a flexible Ethernet client corresponding to the at least one physical layer entity in which the fault occurs,
wherein the periodically sending the fault indication code block to the flexible Ethernet client corresponding to the at least one physical layer entity in which the fault occurs comprises:
sending an idle code block between the fault indication code blocks in adjacent periods.

13. An apparatus comprising a processor, wherein the processor is configured to:
detect whether a fault occurs in at least one physical layer entity included in a flexible Ethernet group; and
when a fault occurs in the at least one physical layer entity, periodically send a fault indication code block to a flexible Ethernet client corresponding to the at least one physical layer entity in which the fault occurs,
wherein the periodically sending the fault indication code block to the flexible Ethernet client corresponding to the at least one physical layer entity in which the fault occurs comprises:
when the fault is detected, consecutively sending at least two of the fault indication code blocks to the flexible Ethernet client corresponding to the at least one physical layer entity in which the fault occurs, periodically sending the fault indication code block to the flexible Ethernet client corresponding to the at least one physical layer entity in which the fault occurs, and sending an idle code block between two adjacent fault indication code blocks of the fault indication code blocks.

14. The apparatus according to claim 12, wherein the fault indication code block comprises a control type field and a fault identification field which is used to indicate an occurrence of the fault occurs in the at least one physical layer entity.

15. The apparatus according to claim 14, wherein the fault indication code block further comprises a fault type identification field, the fault type identification field is used to indicate a fault type of the fault occurred in the at least one physical layer entity, and
wherein the fault type comprises:
the physical layer entity loses a signal;
the physical layer entity cannot lock a code block;
the physical layer entity cannot lock an alignment code block; and
a high bit error rate alarm is detected in the physical layer entity.

16. The apparatus according to claim 12, wherein the fault indication code block is a service layer alarm indication code block, and the service layer alarm indication code block is defined based on a field reserved in an IEEE 802.3 standard specification for a standard Ethernet.

* * * * *